(12) United States Patent
Alexeenko et al.

(10) Patent No.: US 12,399,069 B2
(45) Date of Patent: Aug. 26, 2025

(54) METHOD AND SYSTEM FOR NON-INVASIVELY MONITORING PRODUCT TEMPERATURE IN CONTROLLED LYOPHILIZATION

(71) Applicant: Purdue Research Foundation, West Lafayette, IN (US)

(72) Inventors: Alina Alexeenko, West Lafayette, IN (US); Petr Kazarin, West Lafayette, IN (US); Xiaofan Jiang, West Lafayette, IN (US); Nithin Raghunathan, West Lafayette, IN (US); Dimitrios Peroulis, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/034,750

(22) PCT Filed: Nov. 5, 2021

(86) PCT No.: PCT/US2021/058356
§ 371 (c)(1),
(2) Date: May 1, 2023

(87) PCT Pub. No.: WO2022/099091
PCT Pub. Date: May 12, 2022

(65) Prior Publication Data
US 2023/0417606 A1 Dec. 28, 2023

Related U.S. Application Data

(60) Provisional application No. 63/110,388, filed on Nov. 6, 2020.

(51) Int. Cl.
*G01K 13/00* (2021.01)
*G01K 1/02* (2021.01)
(Continued)

(52) U.S. Cl.
CPC ........... *G01K 13/006* (2013.01); *G01K 1/024* (2013.01); *G01K 1/026* (2013.01); *G01K 7/021* (2013.01); *G01K 7/22* (2013.01); *G01K 2203/00* (2013.01)

(58) Field of Classification Search
CPC ...... G01K 13/006; G01K 1/024; G01K 1/026; G01K 7/021; G01K 7/22; G01K 2203/00;
(Continued)

(56) References Cited

U.S. PATENT DOCUMENTS 6,971,187 B1 12/2005 Pikal et al.
9,453,675 B2 9/2016 Gasteyer, III et al.
(Continued)

FOREIGN PATENT DOCUMENTS

WO 2006053386 5/2006

OTHER PUBLICATIONS

Xiaofan et al., "A non-invasive multipoint product temperature measurement for pharmaceutical lyophilization", Scientific Reports, vol. 12, No. 1, Jul. 14, 2022.
(Continued)

*Primary Examiner* — Laura Martin
*Assistant Examiner* — Julia Fitzpatrick
(74) *Attorney, Agent, or Firm* — Piroozi-IP, LLC

(57) ABSTRACT

A virtual thermocouple system for non-invasively predicting product characteristics is disclosed, which includes one or more temperature sensing systems including a resistive network which includes a temperature sensing device comprising a plurality of negative temperature coefficient (NTC) thermistors, and a load resistor, a corresponding system-on-chip coupled to a corresponding resistive network and configured to i) power the corresponding resistive network, ii) receive corresponding signals from each NTC thermistor of the corresponding temperature sensing device, iii) process
(Continued)

the signal associated with each NTC thermistor of the corresponding temperature sensing device and thus generate data associated with each NTC thermistor, and iv) transmitting the processed data, a power generating device configured to provide power to the corresponding system-on-chip, and a base stations adapted to i) receive the processed data from a corresponding system-on-chip, and ii) using a predefined model, and non-invasively translate the processed data to thermal characteristics of a product.

22 Claims, 16 Drawing Sheets

(51) Int. Cl.
*G01K 1/024* (2021.01)
*G01K 7/02* (2021.01)
*G01K 7/22* (2006.01)

(58) Field of Classification Search
CPC .......... G01K 7/223; G01K 7/226; G01K 7/24; G01K 13/00; F26B 5/06
See application file for complete search history.

(56) References Cited

U.S. PATENT DOCUMENTS

| | | | | |
|---|---|---|---|---|
| 2006/0239331 | A1* | 10/2006 | Schwegman | G01K 1/024 374/E1.004 |
| 2008/0224634 | A1 | 9/2008 | Scilia | |
| 2009/0175315 | A1* | 7/2009 | Schwegman | F26B 5/06 374/E1.001 |
| 2012/0192447 | A1* | 8/2012 | Thompson, Jr. | F26B 5/06 34/287 |
| 2015/0226480 | A1* | 8/2015 | Kuu | F25C 1/00 34/284 |
| 2018/0011502 | A1* | 1/2018 | Brower | G01K 1/14 |
| 2018/0036695 | A1 | 2/2018 | Karatsinides | |
| 2018/0274986 | A1 | 9/2018 | Ganguly et al. | |
| 2018/0306763 | A1 | 10/2018 | Brucker et al. | |
| 2019/0178576 | A1* | 6/2019 | De Beer | F26B 5/06 |
| 2019/0285342 | A1* | 9/2019 | Thompson | F26B 3/20 |
| 2019/0390903 | A1 | 12/2019 | Knight | |
| 2020/0157431 | A1* | 5/2020 | Voorhees | F16K 27/044 |
| 2020/0340743 | A1 | 10/2020 | Strongrich et al. | |

OTHER PUBLICATIONS

Milton et al., Evaluation of Manometric Temperature Measurement as a Method of Monitoring Product Temperature During Lyophilization, PDA J Pharm Sci and Tech 1997, 51 7-16.
Zhang et al., Distribution of Vapor Pressure in the Vacuum Freeze-Drying Equipment, Mathematical Problems in Engineering, vol. 2012, Article ID 921254, 10 pages, 2012.
Massey, Heat and Mass Transfer in Semi-Porous Channels With Application to Freeze-Drying, Iht. J. Heat Mass Transfer. vol. 15, pp. 493-502, 1972.
Rasetto et al., Model based-monitoring of a non-uniform batch in a freeze-drying process, 18th European Symposium on Computer Aided Process Engineering, 2008.
Rasetto et al., On the Use of a Dual-Scale Model to Improve Understanding of a Pharmaceutical Freeze-Drying Process, Journal of Pharmaceutical Sciences, vol. 99, No. 10, Oct. 2010.
Zhu et al., Predictive models of lyophilization process for development, scale-up/tech transfer and manufacturing, European Journal of Pharmaceutics and Biopharmaceutics 128, 363-378, 2018.
Fissore et al., Process analytical technology for monitoring pharmaceuticals freeze-drying—A comprehensive review, Drying Technology,2018, vol. 36, No. 15, 1839-1865.
Ganguly et al., Spatial Variation of Pressure in the Lyophilization Product Chamber Part 1: Computational Modeling, AAPS PharmSciTech, vol. 18, No. 3, Apr. 2017.
Sane et al., Spatial Variation of Pressure in the Lyophilization Product Chamber Part 2: Experimental Measurements and Implications for Scale-up and Batch Uniformity, AAPS PharmSciTech, vol. 18, No. 2, Feb. 2017.
Barresi et al., Use of computational fluid dynamics for improving freeze-dryers design and process understanding. Part 1: Modelling the lyophilisation chamber, European Journal of Pharmaceutics and Biopharmaceutics 129 (2018) 30-44.
ISR for PCT/US2021/58356.
ISR for PCT/US2021/58604.
Jiang et al., Multi-Point Wireless Temperature Sensing System for Monitoring Pharmaceutical Lyophilization. Front. Chem, vol. 6, Article 288, Jul. 17, 2018.
Oddone et al., Non-Invasive Temperature Monitoring in Freeze Drying: Control of Freezing as a Case Study, Drying Technology, 33: 1621-1630, Aug. 31, 2015.
Sensirion, Application Note Dew-point Calculation, www.sensirion.com/humidity, Oct. 3, 2006.

\* cited by examiner

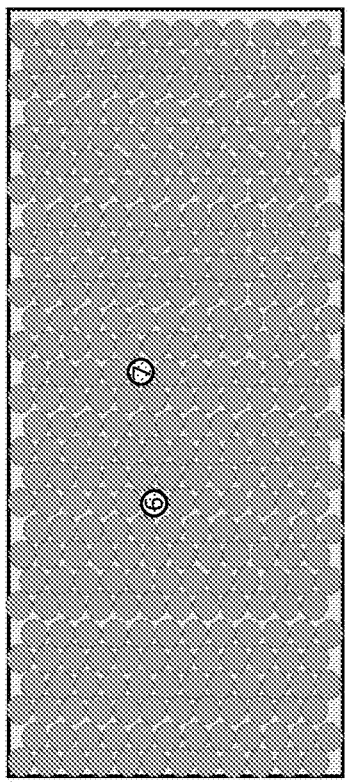
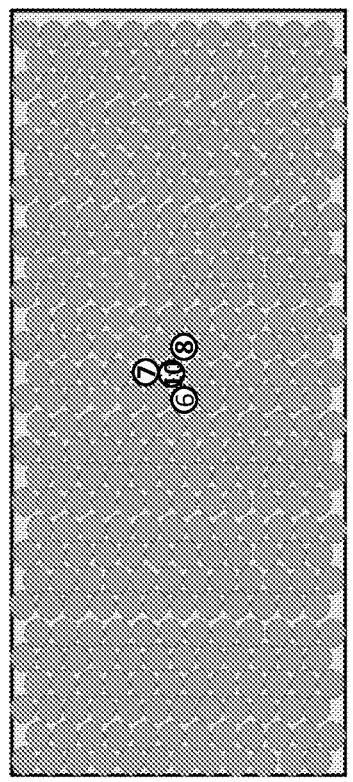
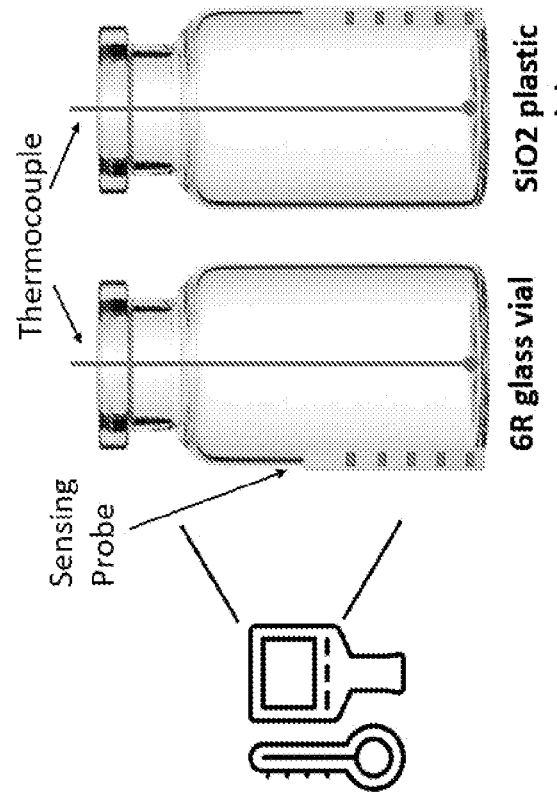
FIG. 5b
FIG. 5c
FIG. 5a
○ Vial with only flexible Sensor
● Vials with flexible sensors and conventional TCs

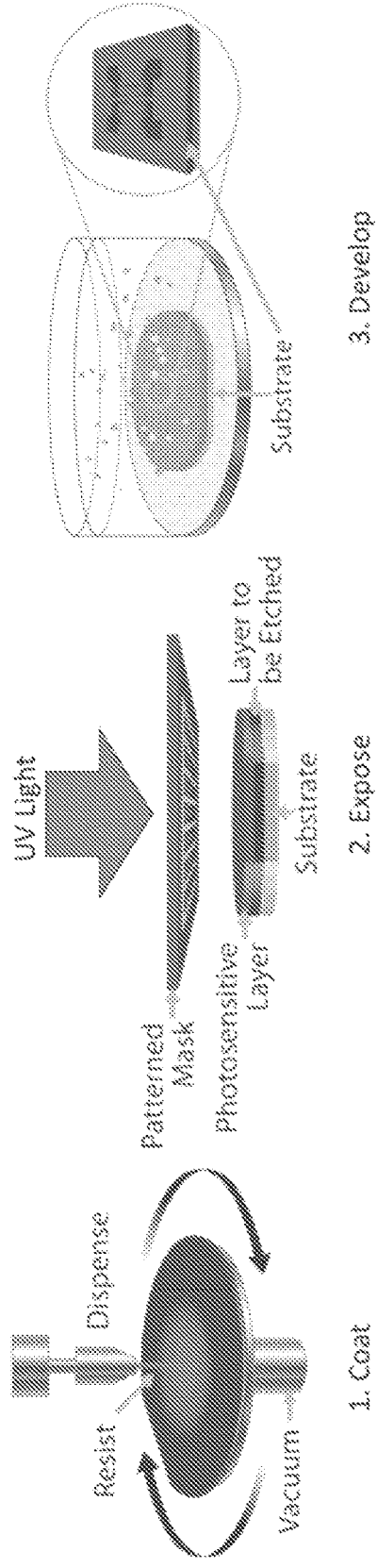
FIG. 14a
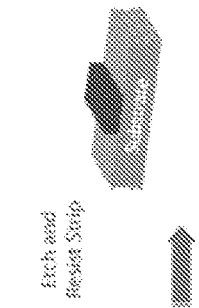
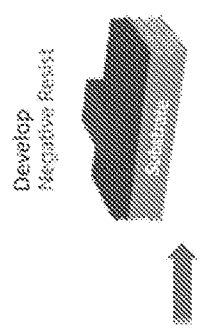
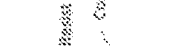
FIG. 14b
FIG. 14c

METHOD AND SYSTEM FOR NON-INVASIVELY MONITORING PRODUCT TEMPERATURE IN CONTROLLED LYOPHILIZATION

STATEMENT REGARDING GOVERNMENT FUNDING

This invention was made with government support under Grant No. IIP1827717 awarded by National Science Foundation. The government has certain rights in the invention.

CROSS-REFERENCE TO RELATED APPLICATIONS

The present patent application is a 35 U.S.C. § 371 Nationalization Application of and claims the priority benefit of the International Patent Application Serial No. PCT/US21/58356 filed Nov. 5, 2021, which is related to and claims the priority benefit of U.S. Provisional Patent Application Ser. No. 63/110,388 filed Nov. 6, 2020 and titled "VIRTUAL THERMOCOUPLE: A NON-INVASIVE PRODUCT TEMPERATURE MEASUREMENT APPROACH FOR CONTROLLED LYOPHILIZATION", the contents of each of which are hereby incorporated by reference in its entirety into the present disclosure.

TECHNICAL FIELD

The present disclosure generally relates to a process for optimizing and control of lyophilization process, and particularly to a method and system for wirelessly monitoring the lyophilization process.

BACKGROUND

This section introduces aspects that may help facilitate a better understanding of the disclosure. Accordingly, these statements are to be read in this light and are not to be understood as admissions about what is or is not prior art.

Lyophilization, or freeze-drying, is a commonly used and well-established process that is used to preserve the original structure of heat-sensitive biological and/or pharmaceutical products (e.g., Antibodies, peptides, vaccines, etc.) for drying and long-term storage (shelf life of pharmaceutical formulations). Freeze-drying involves ice removal from a frozen product at low pressure through a sublimation process. According to the Food and Drug Administration (FDA), about 50% of over 300 FDA and EMA approved biopharmaceutical products are freeze-dried.

A typical freeze-drying cycle consists of three steps. First, the solution is completely solidified during the freezing step. In the second step, denoted as primary drying, the pressure in the drying chamber is reduced and the shelf temperature is elevated to allow sustainable ice sublimation. After the initial ramping phase to the desired shelf set-point, the heat supplied by the shelves and the removal of ice by sublimation are balanced and the system achieves steady-state. During this primary drying phase, the majority of the water in the material is sublimated. However, the residual moisture content may be as high as 7%. Consequently, the next step, denoted as secondary drying, aims to reduce this to an optimum value between 0.5-2%. In this phase, the shelf temperature is raised higher than in the primary drying phase to break any physicochemical interactions that have formed between the water molecules and the frozen material. To preserve product quality, it is necessary for the product temperature to not exceed a threshold value throughout the process and, in particular, during the primary drying stage. This threshold value is a characteristic of the specific product being freeze-dried. For amorphous products, it is often related to the glass transition temperature of the dried product. If the threshold temperature is exceeded, the final dried product may collapse, which could also result in higher moisture content, a longer reconstitution time, and an unacceptable appearance.

Because of these issues, accurate process condition monitoring is needed; and such monitoring is not only related to the threshold temperature, but is also needed to alleviate machine-to-machine and run-to-run process variations. For instance, a vial's heat transfer coefficient and resulting temperature profile are sensitive to variations across different freeze dryers as well as the spatial distribution of vials inside a given freeze dryer. Although such differences may be tolerable in laboratory-scale experiments, they can cause considerable complications in production-level machines.

The traditional monitoring setups in production facilities include inserting miniature fine-gauge thermocouples (TCs) inside the solution to be freeze-dried is the conventional industry practice today. However, this technique has several disadvantages. First, TCs inserted into the vial may affect the product during drying. Specifically, this issue is due to the fact that the thermal distribution inside the product is altered by the relatively high thermal conductivity of the TCs' metallic wires with respect to glass. Second, when a TC comes into direct contact with the drying material, it acts as a nucleation site, thus altering the natural nucleation process without such foreign interference. This may lead to a different structure of the frozen intermediate material (often called frozen cake). Indeed, while the presence of TCs does not significantly alter the cake structure under non-GMP (good manufacturing practice) conditions, differences can still be observed in the drying behavior in the vials with and without TCs. Furthermore, it should be pointed out that conventional thermocouples measure temperature only in specific points, which do not necessarily represent the entire product volume. This results in correctly measuring the product temperature only for a part of the primary drying stage. Also, a thermocouple's position inside a vial strongly affects temperature reading. Others have pointed out that operational errors in thermocouple positioning could cause non-trivial temperature measurement uncertainties. Despite these problems, miniature TCs are commonly used to estimate parameters of interest that cannot be measured directly, such as position and temperature of the moving lyophilization front.

More advanced approaches have been proposed to monitor product temperature of individual vials during the freeze drying process. A non-invasive temperature monitoring method with thin-film thermocouples (TFTCs) has been discussed in the prior art. The proposed method measures vial temperature with TFTCs printed on the outside of the vials. However, this approach does not address two crucial problems. First, the measured temperature is only recorded on the outside vial wall. Hence, it does not represent the actual temperature of the product. Second, TFTCs still require metallic wires to operate, which could cause unintentional heating that may alter the drying process. The inventors of the present disclosure have previously proposed a wireless solution based on low-power sensing electronics to measure product temperature. This approach resolves the TC-induced heating concern while still allowing for direct product measurement. However, the sensing is invasive and may interfere with the freeze-drying behavior. Others have also proposed a numerical model to simulate the lyophilization process in a vial. The model demonstrated a reasonably good agreement with experimental results. However, such modeling is highly dependent on pre-calibration/tuning of parameters (e.g., the heat transfer coefficient($k_v$)) that can vary significantly from vial-to-vial, run-to-run, and machine-to-machine. Consequently, although such a modeling-only approach may be helpful in lab-scale-sized experiments, it is not suitable for large-scale experiments with hundreds of thousands of vials.

Therefore, there is an unmet need for a novel approach to accurately measure product temperature in vials in a lyophilization process which is not invasive and can accurately measure the temperature of the product within the vials.

SUMMARY

A virtual thermocouple system for non-invasively predicting product characteristics in a lyophilization process is disclosed, which includes one or more temperature sensing systems each configured to be placed on an associated vial within a lyophilization chamber. The temperature sensing system includes a resistive network. The resistive network includes a temperature sensing device comprising a plurality of negative temperature coefficient (NTC) thermistors, and a load resistor coupled to a corresponding NTC thermistor thus generating a corresponding voltage divider circuit. A corresponding system-on-chip coupled to a corresponding resistive network and configured to i) power the corresponding resistive network, ii) receive corresponding signals from each NTC thermistor of the corresponding temperature sensing device, iii) process the signal associated with each NTC thermistor of the corresponding temperature sensing device and thus generate data associated with each NTC thermistor, and iv) transmitting the processed data. The system also includes a power generating device configured to provide power to the corresponding system-on-chip, and a base stations adapted to i) receive the processed data from a corresponding system-on-chip, and ii) using a predefined model, non-invasively translate the processed data to thermal characteristics of a corresponding product within the corresponding vial.

According to one embodiment, each NTC thermistor having a first terminal and a second terminal.

According to one embodiment, each of the first terminals of the plurality of the NTC thermistors configured to be placed at a corresponding height on a corresponding vial.

According to one embodiment, each of the second terminals of the plurality of the NTC thermistors configured to terminate at a uniform plane.

According to one embodiment, each of the one or more temperature sensing devices includes between 2 and 20 NTC thermistors.

According to one embodiment, the NTC thermistor with the lowest disposed first terminal is configured to be placed on the vial so that the associated first terminal is aligned with a bottom portion of the vial.

According to one embodiment, distance between two adjacent NTC thermistors is between about 1 mm and about 10 cm.

According to one embodiment, nonlinear characteristic of each NTC thermistor is defined based on:

$1/T = A + B\ln(R) + C(\ln(R))3$ where T is temperature in degrees Kelvin,
Ln(R) is a natural logarithm of measured resistance of the associated NTC thermistor, and
A, B, and C are constants.

According to one embodiment, the one or more system-on-chips transmit the processed data each via a wireless link.

According to one embodiment, the power generating device is an RF energy harvester.

According to one embodiment, the power generating device is a battery.

According to one embodiment, each of the temperature sensing systems is packaged as a single package.

According to one embodiment, each of the temperature sensing systems is packaged as two or more packages.

According to one embodiment, the predefined model is defined based on heat mass transfer characteristics of a vial, a product within the vial, and ambient conditions of the vial.

According to one embodiment, wherein the heat mass transfer characteristics of the model includes: i) fixed simulation parameters; ii) process simulation parameters; and iii) tuned process parameters.

According to one embodiment, the fixed simulation parameters are not subject to change from run to run for the same product and include: i) ice heat capacity, ii) product heat capacity, iii) vapor heat capacity, iv) latent heat of sublimation ice thermal conductivity, v) product thermal conductivity, vi) vapor thermal conductivity, vii) vapor molar mass, viii) vapor viscosity ice density, ix) product density, x) silica glass heat capacity, xi) silica glass density, and xii) silica glass thermal conductivity.

According to one embodiment, the process simulation parameters are parameters which include: i) air temperature, ii) initial product temperature, iii) shelf temperature, and iv) chamber pressure.

According to one embodiment, the tuned process parameters that vary from vial to vial and include heat transfer coefficients as well as product characteristics including permeability and porosity.

According to one embodiment, the predefined model predicts spatial and temporal thermal characteristics of the product inside the vial as well spatial and temporal characteristics of the vial surface.

According to one embodiment, the spatial and temporal characteristics of the vial surface predicted by the predefined model are compared to temporal and spatial thermal characteristics measured by a corresponding one or more temperature sensing systems and differences therebetween generate an error value used as an error correction measure.

According to one embodiment, the tuned process parameters are iteratively varied based on the error coaction measure, until the error value is below a predetermined number, thereby generating a finalized predefined model.

According to one embodiment, the finalized predefined model is applied to spatial and temporal measurement of the one or more temperature sensing systems in order to predict thermal characteristics of an associated product within an associated vial.

BRIEF DESCRIPTION OF DRAWINGS

FIG. 5a is a schematic of an experimental setup for the experiments carried out according to the present disclosure, which includes two isolated vials (glass and plastic) with a thermal camera.

FIG. 5b is a schematic for two center vials on a tray in a lyophilization process that are equipped with the temperature sensing system (virtual thermocouple) and conventional thermocouples placed in the center of a full tray.

FIG. 5c is another schematic for experimental set-up for three center vials on a tray in a lyophilization process two of which are equipped with the temperature sensing system (virtual thermocouple) only and one that is equipped with both the temperature sensing system and a conventional thermocouple.

FIGS. 14a and 14b are schematics of a method of manufacture of the temperature sensing device shown in FIG. 1, according to one embodiment of the present disclosure.

FIG. 14c is a plan view of a vial with the temperature sensing device coupled thereto.

DETAILED DESCRIPTION

Figure 1:
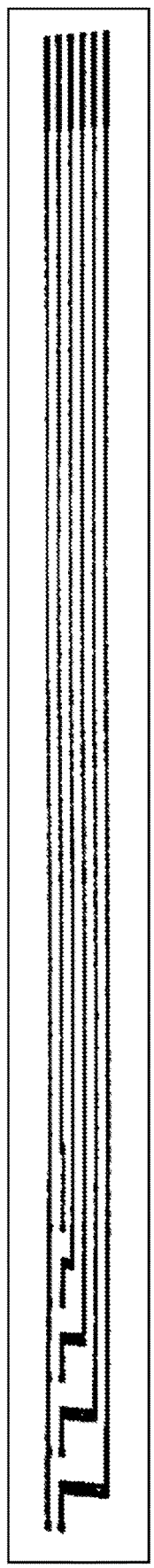
FIG. 1 is a top view of a temperature sensing device, according to the present disclosure, depicting a plurality of negative temperature coefficient (NTC) thermistors.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel method and system is disclosed herein to accurately measure product temperature in vials in a lyophilization process which is not invasive and can accurately measure the temperature of the product within the vials. This novel system is referred to herein as the "Virtual Thermocouple system" that allows for a non-invasive and fully wireless measurement approach that overcomes the main above-mentioned limitations. This technology comprises three main parts: a) a temperature sensing device that are externally attached to the vials, b) a low-power wireless electronics that read and transmit data wirelessly, and c) a numerical model that translates the temperature profile measured from the vial wall to the actual product temperature. The system of the present disclosure can effectively be used for non-invasive real-time monitoring of the drying dynamics and product temperature during the freeze-drying process.

Referring to FIG. 1, a top view of the temperature sensing device of the present disclosure is provided. The temperature sensing device (also referred to herein as the sensing probe, the NTC thermistor, the NTC thermocouple, flexible temperature sensing probe/device, or virtual thermocouple) includes multiple negative temperature coefficient (NTC) thermistors, each forming a sensing element, mounted to a flexible substrate, to thereby making the entire temperature sensing device flexible and adapted to be attachable to a curved surface of a vial. The "Z-shaped" configuration of each sensing element is for sake of layout. The main variable controlling the performance of these sensing elements is the height of termination of the first terminal. In other words, each sensing element includes two termination points (i.e., terminals), a first terminal and a second terminal. For simplicity, all the second terminals terminate at the same plane, however, each of the first terminals terminate at different heights, with the exception of the first and last sensing elements, which both terminate at the extreme lowest levels, configured to measure temperature at the base of the vial. The termination configuration of the first and last sensing elements is based on one embodiment of the present disclosure, and thus no limitation is intended thereby. The change in resistance in each thermistor denotes an associated temperature of the vial at the associated height. Therefore, the second sensing element from the end measures the temperature at a point slightly higher than the last sensing element; similarly, the third sensing element from the last measures the vial temperature at a slightly higher point than the second from last sensing element, and so on. These changes of resistance are monitored vs. time, thereby generating a temperature vs. time profile at different heights, as further discussed below. By placing the temperature sensing device shown in FIG. 1, on outside of a vial, one can obtain the product temperature at multiple heights, as fully discussed below based on a model that uses heat-transfer concepts from a shelf on which the vials are placed and further including a plurality of other heat transfer mechanisms, described below. The temperature sensing device includes between 2 to 20 sensing elements with the bottom sensing portion of the most bottom-reaching NTC thermistor positioned at or near the base of the vial. The lateral distance between two adjacent sensing elements is between about 1 mm and about 10 cm, or according to one embodiment about 3 mm. The length of each NTC thermistor varies as discussed herein and is a function of the vial height. It should be noted as discussed with respect to FIG. 3*a*, that the temperature sensing device shown in FIG. 1 is part of temperature sensing system, all of which are packaged together and placed on the vial as one package. It should also be noted that according to one embodiment, there is one temperature sensing system, and thus one temperature sensing device including a plurality of sensing elements per vial.

Figure 2:
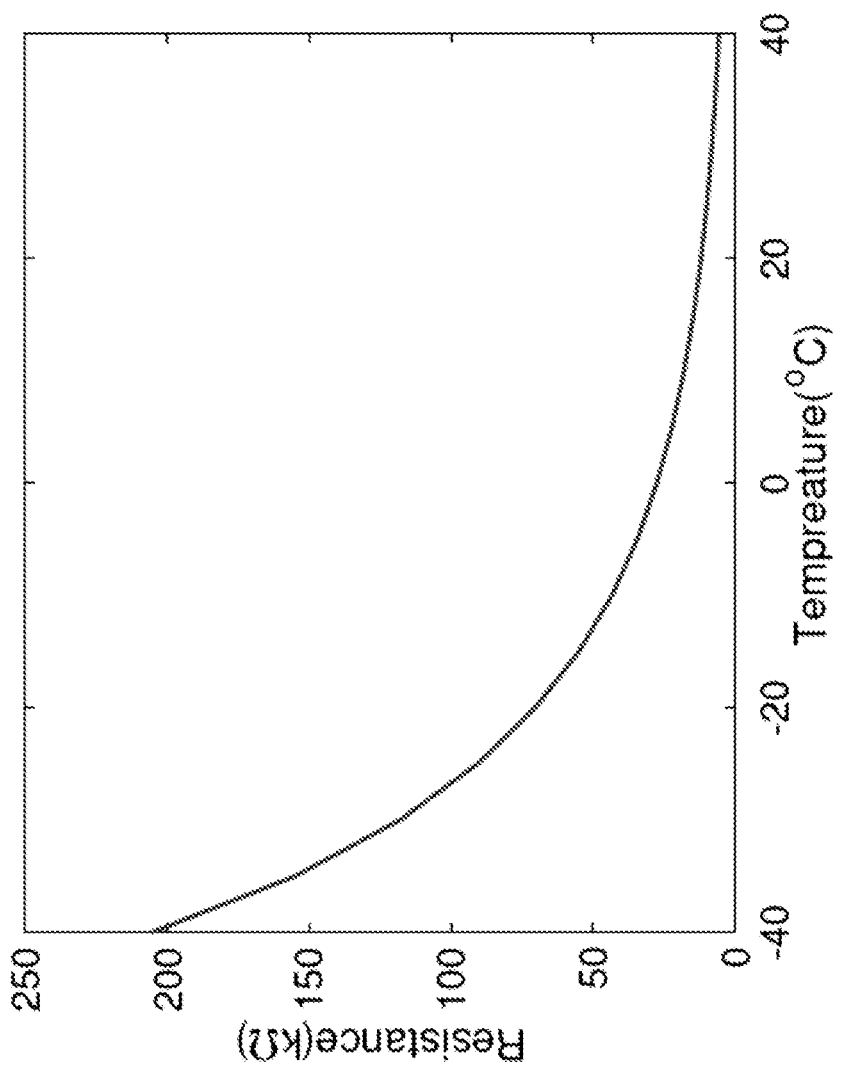
FIG. 2 is a graph of resistance in kohms vs. temperature in ° C. of a 10K ohms NTC thermocouple.

The NTC thermistor has a small-footprint (between about 0.4 mm to about 0.2 mm). This thermistor is constructed of metal oxides, which when passed through a sintering process, provides a negative electrical resistance (R) dependence versus temperature (T). Due to having a large negative slope, a small temperature change causes a substantial change in electrical resistance at lower temperature. The disadvantage of such an NTC thermistor is its nonlinear characteristic. Consequently, each NTC thermistor has to be calibrated to ensure measurement accuracy. The Steinhart-Hart(S-H) equation is the most commonly used model to describe the nonlinear characteristic of the thermistor as shown below:

$$1/T = A + B\ln(R) + C(\ln(R))^3 \quad (1)$$

where T is temperature in degrees Kelvin,
Ln(R) is the natural logarithm of the measured resistance of the thermistor, and
A, B, and C are constants.
To obtain the values of these constants each thermistor is measured at three different temperatures: 20° C., 0° C., and −40° C. Subsequently, the coefficients of a third-order polynomial in the log-resistance values are fit to best match the inverse-temperature values.
Referring to FIG. 2, resistance response vs. temperature of a 10K ohms NTC thermocouple is provided.

Figure 3A:
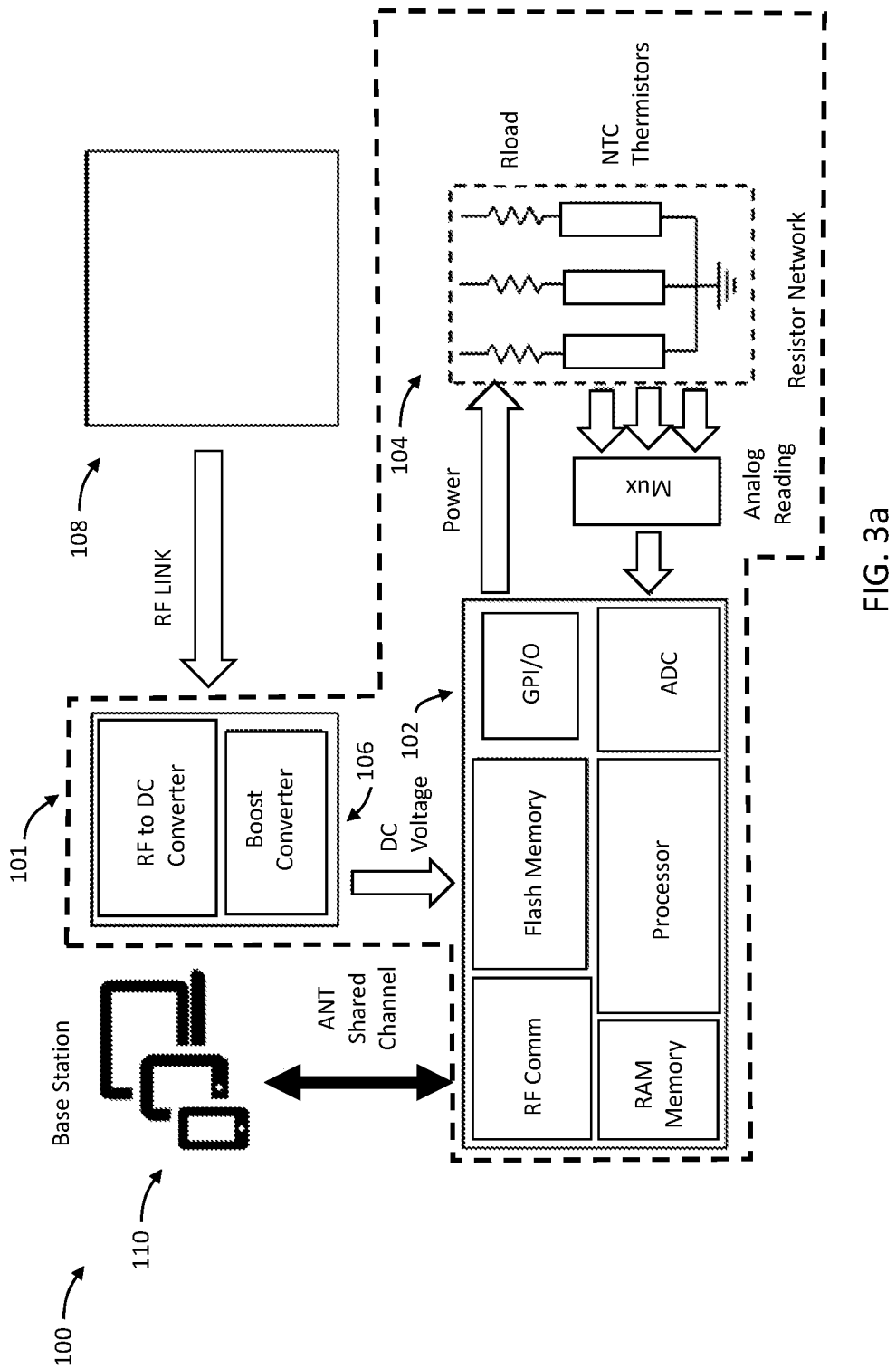
FIG. 3*a* is a block diagram of a low power wireless sensing system also collectively referred to herein as the virtual thermocouple system.

As discussed above, the NTC thermocouple shown in FIG. 1 is used in a wireless system adapted to communicate vial temperatures at various heights in a wireless manner. Referring to FIG. 3*a*, a block diagram of a low power wireless sensing system 100 is shown. The system 100 is also collectively referred to herein as the virtual thermocouple system, includes three main components: 1) a temperature sensing system 101, 2) an RF generating system 108, and a base stations 110. As discussed above, the temperature sensing system 101 is based on several components discussed herein, however, it should be noted that all the components of the temperature sensing system 101 can be packaged together and adapted to be placed on a curved surface of a vial (i.e., the entire package is adapted to be flexible), or alternatively, one or more components can be packaged together yielding two or more packages that are interconnected but still adapted to be placed on the curved surface of the vial. The temperature sensing system 101 includes a system-on-chip 102, e.g., an nRF52832 system-on-chip from NORDIC SEMICONDUCTOR, which is employed to process and transmit measurements from a resistor network 104 which includes the above-described temperature sensing device (shown in FIG. 1) and which includes a plurality of NTC thermistors. The system-on-chip 102 is adapted to power the resistor network 104. The system-on-chip 102 is powered by an RF energy harvester 106, e.g., a P2110B RF harvester from POWERCAST, which typically includes an RF to DC converter block which is adapted to store the harvested RF energy into a supercapacitor (not shown). The energy harvester 106 also includes a boost converter in order to boost the voltage of the energy harvester 106 to that which is required by the system-on-chip 102. Alternatively, the energy harvester 106 may be replaced by a battery that is part of the overall package of the wireless temperature sensing system 10. The system-on-chip 102 includes an RF communication block adapted to communicate with the base station 110 via an RF link, e.g., a 2.4 GHz radio link, measurements from the resistor network 104. While a wireless link is highly desirable, a wired link is also within the ambit of the present disclosure between the system-on-chip 102 and the base station 110. Additionally, the system-on-chip 102 includes Flash memory used as a non-volatile memory for operations of the system-on-chip 102, RAM memory used as a volatile memory for various operations, e.g., scratch pad operations, a processor, general purpose I/O, and an onboard analog to digital converter (ADC), e.g., a built-in 12-bit successive-approximation analog-to-digital converter (SAADC). Temperature sensing in the form of voltage signals from the resistor network 104 is converted to digital values utilizing the onboard ADC. The temperature sensing device including the NTC thermistors are coupled to a network of load resistors, e.g., 97 kΩ load resistors, thereby generating a network of voltage dividing circuits each. Each voltage dividing circuit is independent for each thermistor and is independently powered by the general-purpose input/output (GPIOs) pins from the system-on-chip 102. The bridge voltage from each voltage-dividing circuit is connected to an 8-to-1 multiplexer, a pre-gain amplifier (not shown) which one or both can be part of the system-on-chip 102 or part of the resistive network 104, but in either case, communicating with the built-in ADS onboard the system-on-chip 102 (e.g., with a 0.6 V reference voltage). The multiplexer and the amplifiers can be integrated onboard the system-on-chip 102 (in an application specific integrated circuit), or alternatively provided as a standalone discrete circuitry. During operation, the system-on-chip 102 dynamically adjusts the pre-gain amplifier (not shown) for each sensing element (i.e., each NTC thermistor) to counter the nonlinear characteristic of the thermistor and avoid voltage saturation.

The RF generator 108 provides RF energy to be used within the lyophilization chamber (not shown). The generated RF energy is utilized by the energy harvester 106 to generate needed voltage for the system-on-chip 102 which in turn powers the resistive network 104, the multiplexer, and the amplifiers (not shown).

As discussed above, the novel wireless temperature sensing system 101 represents two of the three components of the wireless sensing system 100 of the present disclosure.

Figure 4:
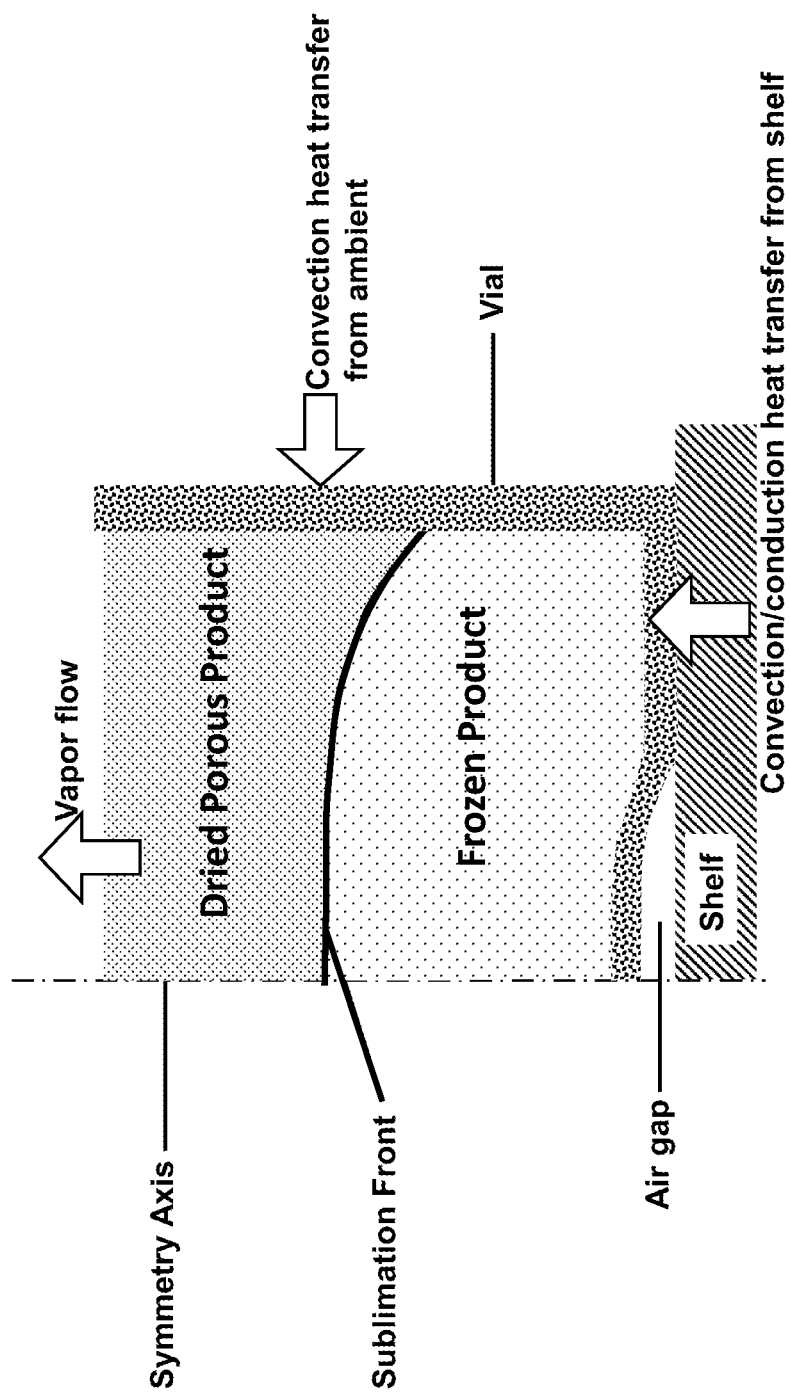
FIG. 4 is a schematic of heat transfer mechanisms in the vial and product during a lyophilization process.

These two components are 1) the temperature sensing device (shown in FIG. 1) which includes a plurality of NTC thermistors and which is shown as part of the resistive network 104, and 2) the remainder of the temperature sensing system 101 including the system-on-chip 102, the energy harvester 106, the multiplexer and the amplifiers (not shown). However, a model is needed to translate the temperature measured on the surface of the vial to the temperature and other characteristics of the product inside the vial in this non-invasive way of measuring. To carry out this translation, a numerical model for the primary drying stage of the solution in a vial using the COMSOL Multiphysics software was created. The model allows one to obtain via simulations the temperature distribution on the vial surface as well as inside the vial (product temperature) and other characteristics, e.g., sublimation front. The simulation results are then validated against the actual measurements from the NTC thermistors to show excellent agreement therewith. During the building phase of the model, differences between computed (i.e., predicted) outside the vial temperatures and actually measured temperatures via the NTC thermistors both as a function of time are used to fine-tune the model as discussed below. Once the model reaches satisfactory agreement with the NTC thermistors, then the model can be used in operation in a reverse flow from the outside of the vial temperatures measured by the NTC thermistors as a function of time to accurately predicting product temperature and other characteristics (e.g., the sublimation front) also as a function of time in a non-invasive manner. The model is resident at a remote server, e.g., housed in the base station 110. In the model we numerically solve the transient (time-domain) heat and mass transfer problem during the primary drying phase of the product in a glass vial. In addition, the height variation of the product and vial temperatures as well as the position of the sublimation front are predicted. The geometry and the boundary conditions for the 2D axisymmetric problem statement are shown in FIG. 4, which is a schematic of heat transfer mechanisms in the vial and product during the lyophilization process. It should be noted that for numerical purposes, the vial is filled with frozen mannitol (5% solution). When the simulation starts, this is split into the frozen zone (96% of total volume) and the dried zone (4% of total volume).

Figure 3B:
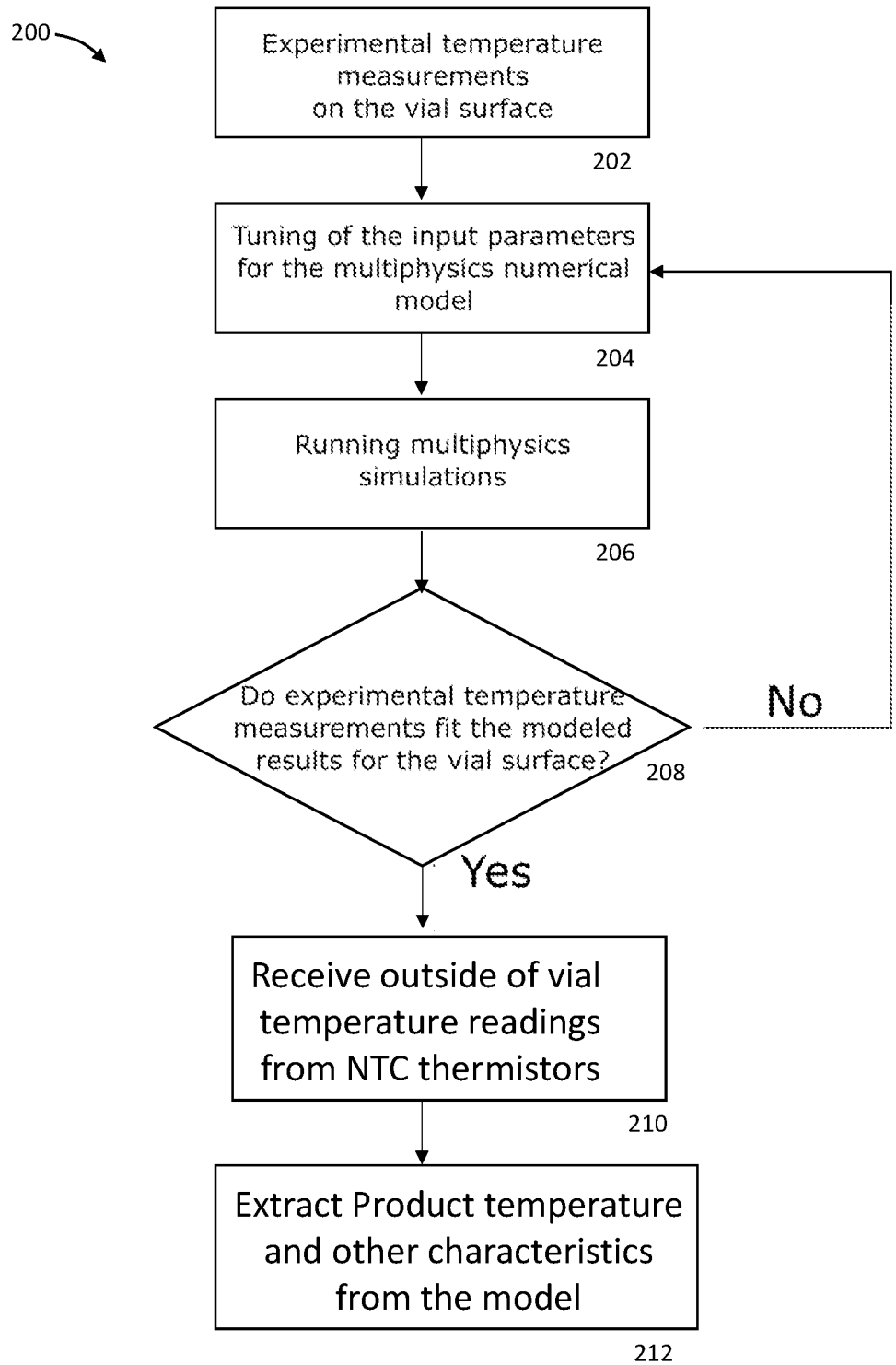
FIG. 3b is a flowchart of a modeling aspect of the present disclosure utilized to non-invasively translate temperature on the outside of vials to product thermal characteristics inside the vial.

Referring to FIG. 3b, a flowchart of the model is shown. As discussed above, the modeling aspect of the virtual thermocouple system 100 (see FIG. 3a) is comprised of the experimental temperature measurements on the surface of the vial and the Multiphysics heat and mass transfer simulations during the primary drying stage of the lyophilization process. The core of the technology is the Multiphysics numerical model which is fit to the noninvasive experimental temperature measurements of the product within the vial from temperature measurements of the surface of the vial. The fit is performed by tuning several input parameters (heat transfer coefficients on the boundaries, product characteristics such as permeability and porosity) and using the experimental measurements (shelf temperature, air temperature, chamber pressure), as further discussed below. The main output is the temperature of the product which is further validated by the thermocouple measurements.

The numerical model 200, shown in FIG. 3b, for obtaining the temperature profile of the vial and the product temperature and characteristics (e.g., sublimation front) during the primary drying stage of the lyophilization process is developed using the COMSOL Multiphysics software. Particularly, the process of ice sublimation with the moving interface between the dried region (dried product) and the ice region (frozen product) is modeled. The heat transfer equations for the ice region without convection and for the dried region with convection are solved. The mass transfer is resolved using Darcy's law and the vapor density is calculated with the ideal gas law. The heat exchange with the surrounding air and the shelf where the vial resides is considered through the heat transfer coefficients. The dried and frozen regions are assumed to be homogeneous and the presence of the inert gas during the primary drying process is neglected. Also, for numerical purposes, the vial geometry is simplified (the bottom of the vial is set to be flat) to accommodate the moving mesh interface setup between the dried and frozen region as well as compute coupled heat and mass balances. However, for the heat transfer modeling accuracy, the curvature of the vial bottom is accounted for by different heat transfer coefficients for the touching portion of the vial bottom/shelf surface and the one which interacts with the air gap between the shelf and the vial.

The model 200 begins by receiving experimental temperature measurements of the vial surface as a function of time, as shown by block 202. Next in block 204, the input parameters are tuned, as discussed below. Next, as shown in block 206 the Multiphysics simulations are performed from ambient heat-mass conditions in order to generate the outside-vial temperatures as a function of time. Next, as shown in decision block 208, experimental data of the vial surface obtained in block 202 are compared with computed data for the vial surface. If the two sets of data agree according to a predetermined criterion, then the model is complete; if not, the model returns to block 204 and retunes input parameters and thus reiterates. If the model is found to be acceptable, then the model can begin to be used beginning from step 210. In operation, temperature data from the vial surface is obtained and applied to the model in a reverse manner, as shown in block 210; and thereafter, the model extracts product temperature and other characteristics, e.g., sublimation front, as shown in block 212.

FIG. 4 shows several heat transfer mechanisms that are accounted for in the model of the present disclosure: convection and conductive heat transfer from ambient, heat exchange between vial, dried/frozen product, and shelf. The system of equation encompasses the heat transfer equations for porous media in the dried and frozen domains. The vapor convection is also taken into account in the dried region. The temperature at the sublimation interface is calculated using the saturation vapor pressure (Clausius-Clapeyron equation):

$$T_s = (2.19 \times 10^{-3})/(28.89 - \ln(p)) \quad (2)$$

The Stefan condition is applied to get interface velocity as provided in equation 3:

$$v_s = Q_s / \varepsilon \rho_{ice} L_s \quad (3)$$

where $Q_S$ is the normal heat flux jump at the interface. This equation is evaluated using the Lagrange multiplier with enabled weak constraints.

The mass transfer in the porous domain is resolved using the Darcy's law, and is used to calculate the vapor pressure and velocity in that domain. The material properties of the dried domain are assumed to be constant. The chamber pressure is set at the top of the vial. The transient analysis with the deformed geometry interface is performed to track the sublimation interface inside the vial (FIG. 4). Coupled heat transfer equations for the ice region without convection and for the dried region with convection are solved, and the sublimation interface is tracked using the moving mesh interface (see FIG. 7).

Freeze-drying runs were performed in a laboratory-scale freeze-dryer (REVO, MILLROCK TECHNOLOGY, Kingston, NY). The freeze-dryer is equipped with a vacuum capacitance manometer and a Pirani gauge pressure sensor. A 915-MHz monopole antenna is mounted on the side of the chamber for wirelessly powering the sensors. Also, to prevent leaks and protect the coaxial cable from the vacuum during freeze drying, a custom vacuum feed-through Sub-Miniature version A (SMA) connector is used to pass the RF coaxial cable inside the chamber to power the antenna. The data-collecting computer in the base station 110 (see FIG. 3a) is also equipped with a 2.4-GHz ANT-connectivity USB stick for enabling the needed sensor connectivity.

TABLE 1

Freeze drying recipe for 5% w/v mannitol solution in 6R Schott vials

|  | 1 | 2 | 3 | 4 |
|---|---|---|---|---|
| Freezing step |  |  |  |  |
| Shelf setpoint [° C.] | 20 | 20 | −45 | −45 |
| Time [min] | 0 | 10 | 180 | 120 |
| Primary drying |  |  |  |  |
| Shelf setpoint [° C.] | −45 | 20 | 20 |  |
| Time [min] | 5 | 60 | 180 |  |
|  |  |  | 0 |  |
| Vacuum setpoint [mTorr] | 60 | 60 | 60 |  |

With this setup, three sets of freeze drying experiments were performed to evaluate the NTC thermistor performance. Each set focuses on exploring a different scenario as discussed below. In addition, experiments in each set are repeated at least three times to provide reliable data. Predefined freeze drying recipes provided in Table 1 are used in all three runs in 6R SCHOTT® pharmaceutical vials with 4 ml filled with 5% D-mannitol solution (Sigma Chemical Company, Germany). Type T conventional thermocouples from Omega were used to measure the shelf temperature, air temperature, and product temperatures for all three experiments.

Referring to FIG. 5a, a schematic of an experimental setup for the experiments carried out is presented, which includes two isolated vials (glass and plastic) with a thermal camera. The first set of experiments depicted in FIG. 5a focuses on establishing proper sensor performance on two vial types (glass and plastic). Specifically, we test the sensors on two different types of vials made of glass (6R) and plastic ($SiO_2$). In each vial type we also insert conventional thermocouples (TCs) at the bottom-center location to measure the product temperature. A Thermal IR camera (FLIR LEPTON 3.5) is used to monitor the freezing behavior of the product.

The second set of experiments focuses on evaluating the performance of the virtual thermocouple in realistic freeze drying conditions. Referring to FIG. 5B, a schematic is provided for two center vials equipped with virtual thermocouples placed in the center of a full tray. In this set, two vials equipped with the virtual thermocouples (all the vials in FIG. 5b and FIG. 5c), as well as with conventional TC (vials 6,7 in FIG. 5b and vial 10 in FIG. 5c) are placed in the center of the tray (marked as 6 and 7). The tray includes a total of approximately 400 vials.

In the third set of experiments, four vials equipped with the virtual thermocouples are placed next to each other in the center of the tray. Referring to FIG. 5c, another schematic is shown for experimental set-up for testing the thermocouple heating. Unlike the first and second sets, only the center vial (circle with dots) is also equipped with a conventional TC. The purpose of this set is to evaluate the conventional TC heating effects with the help of the proposed virtual thermocouples.

Figure 6A:
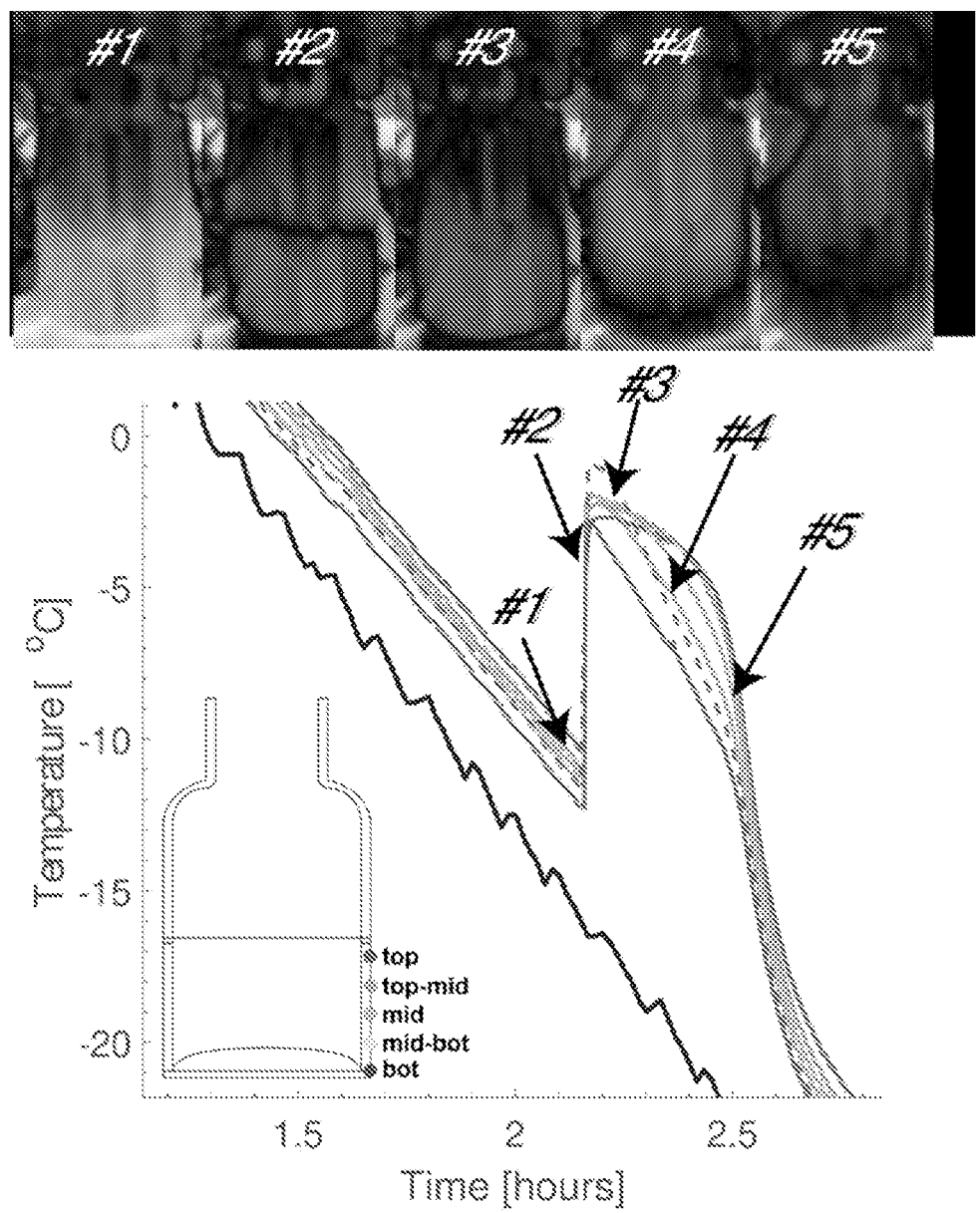
FIGS. 6a and 6b are graphs of temperature in ° C. vs. time in hours providing temperature profile measured by the temperature sensing device and thermal camera shots (5 moments of time) for glass (FIG. 6a) and plastic vials (FIG. 6b) during the freezing stage of 4 ml 5% Mannitol solution in 6R SCHOTT vials.
Figure 6B:
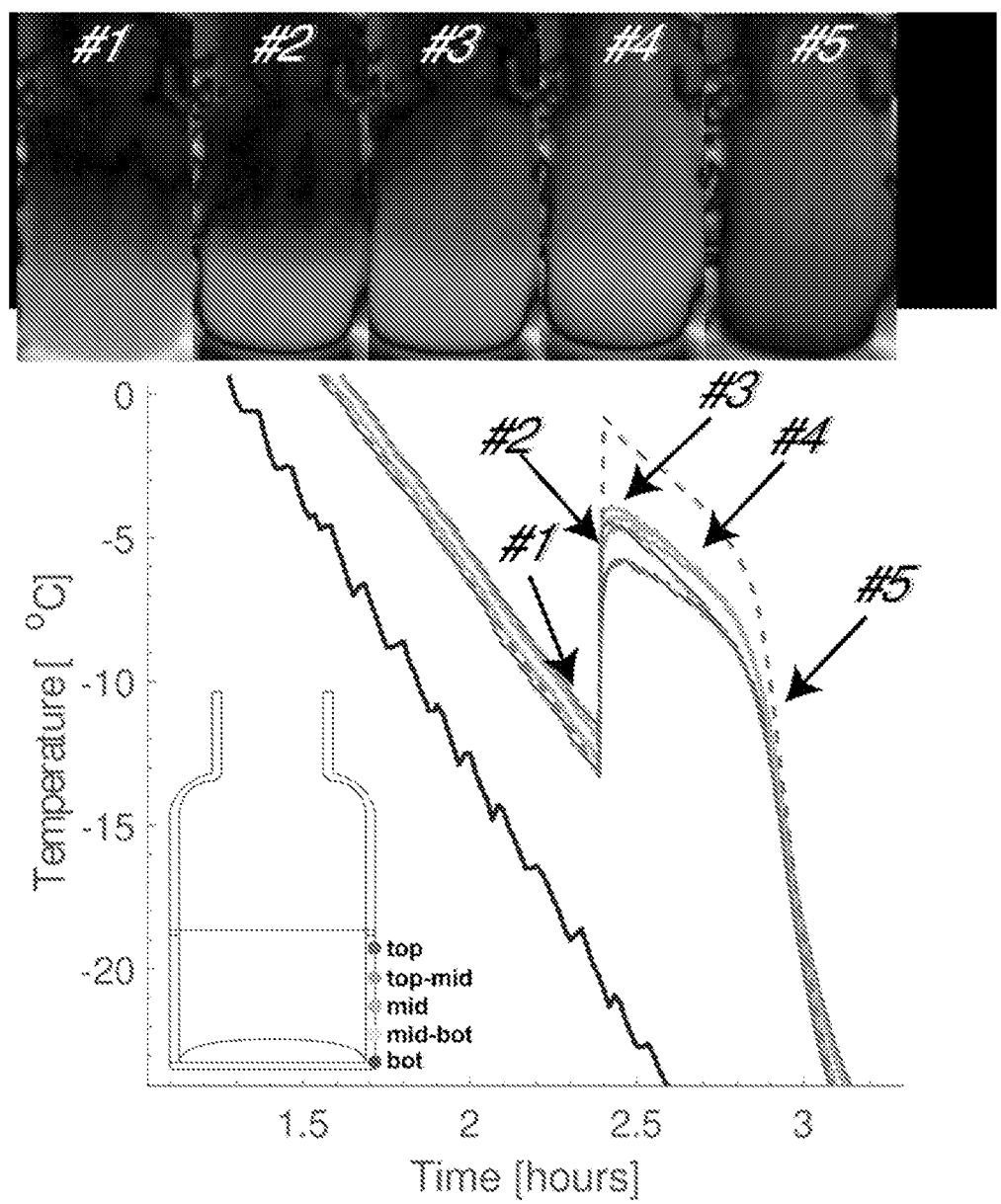

Referring to FIGS. 6a-6b, results of the experiments depicted in FIG. 5a are presented. Specifically, FIGS. 6a and 6b are graphs of temperature in ° C. vs. time in hours providing temperature profile measured by the temperature sensing device and thermal camera shots (5 moments of time) for the glass (FIG. 6a) and the plastic vials (FIG. 6b) during the freezing stage of 4 ml 5% Mannitol solution in 6R SCHOTT vials. FIGS. 6a and 6b show the temperature profile as measured by the five sensing elements of the virtual thermocouple during the freezing stage of the first set of experiments for the glass and plastic vials. In both cases, the bottom sensing element reads the lowest temperature, while the top element shows the highest. This pattern is expected since the bottom sensing element is placed right at the bottom of the vial, which is closest to the shelf. The thermal camera shots for the glass and the plastic vials are also depicted, see FIG. 5a.

In both vials, thermal image #1 shows the moment right prior to onset of nucleation. As shown in FIGS. 6a and 6b, uncontrolled nucleation starts right after moment denoted as #1 and results in a sharp rise in temperature (point #2 on the graph). Both moments are captured by the thermal camera for both vials. However, due to the different thermal conductivity of glass and plastic, the two temperature profiles captured by the virtual thermocouples are slightly different. For the glass vial, all sensing elements quickly rise to 2° C., just slightly below the product temperature. On the other hand, for the plastic vial, the sensing elements of the virtual thermocouple reach lower temperatures up to 5° C.

In addition, the post-nucleation temperature profiles of the two vials are different as well. As the sensing elements indicate on point #4, the glass vial is cooled from the bottom. During nucleation process (from point #1 to point #2), temperature is increasing from the bottom to the top of the vial. On the other hand, such a cooling profile was not observed in the case with the plastic vial. The product seems to freeze uniformly inside the plastic vial. These results show that the virtual thermocouple successfully captures the freezing dynamics in both vials.

Figure 7:
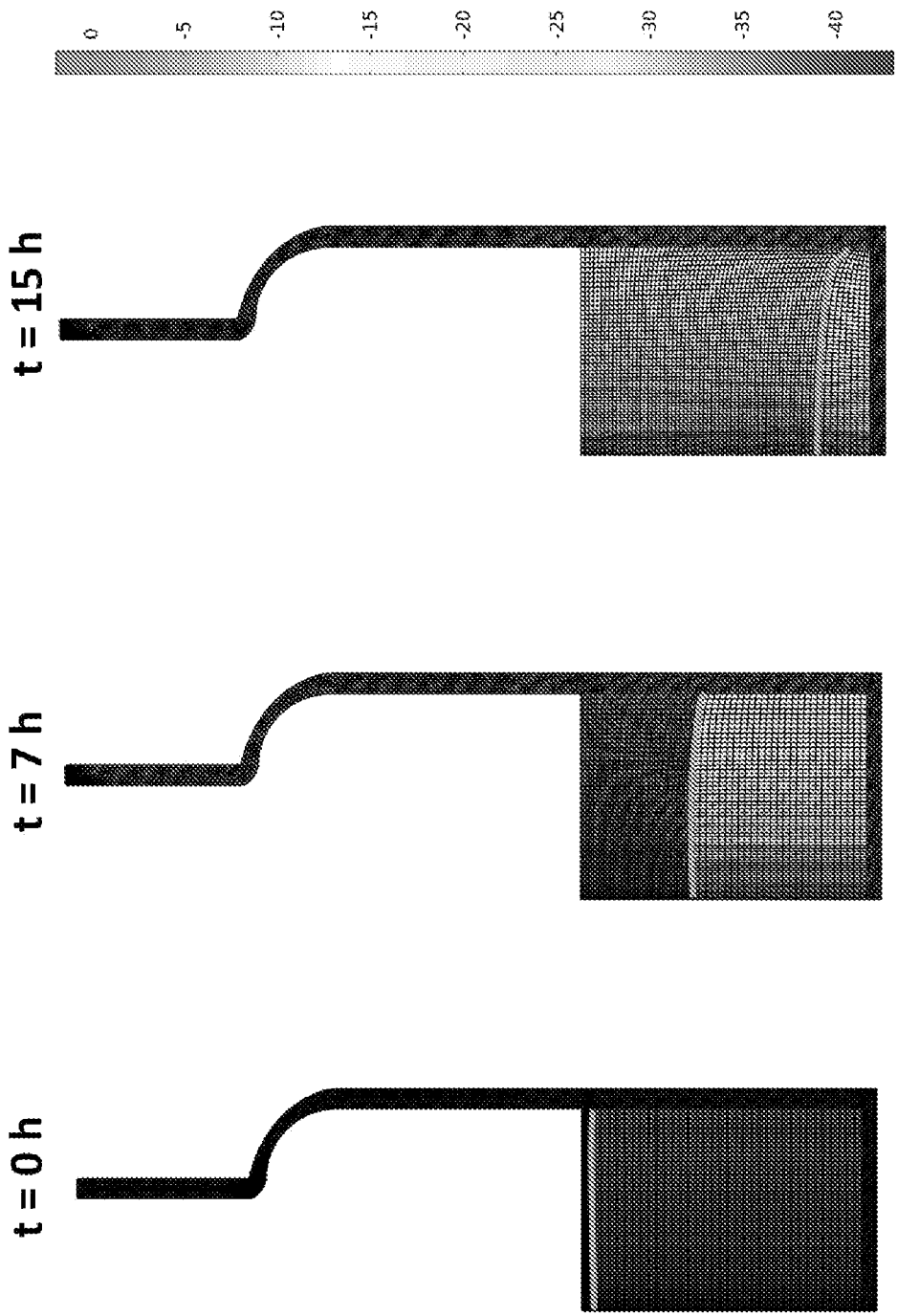
FIG. 7 provides simulated sublimation front position in three panels (curves in each panel) with computational mesh and temperature fields of the vial and the product for 0, 8 and 16 h for three moments of time.

Next, the primary drying stage is modeled and compared with the temperature sensing devices of the present disclosure and traditional thermocouple readings with actual experimental data. A full shelf of 6R vials (403 units) filled with 4 ml 5% Mannitol solution is freeze-dried in the REVO MILLROCK lyophilizer. The chamber pressure is set to 60 mTorr and the shelf temperature to 20° C. Referring to FIG. 7, simulated sublimation front position are shown in three panels (curves in each panel) with computational mesh and temperature fields of the vial and the product for 0, 8 and 16 h are provided for three moments of time. The porous and solid domains are meshed with a structured mapped grid while the vial domain is meshed with an unstructured grid. The simulation starts with a uniform initial temperature of 228° K for vial and product and then the front advances downwards. The automatic re-meshing of the entire geometry occurs when cells' distortion reaches a certain level. The sublimation stops when the front touches the bottom of the vial after 15.7 hr. During the primary drying process, the vial heats the product making the front propagate faster in the vicinity of the vial wall and it becomes convex. The product and the vial temperature increases as the simulation advances due to several heat transfer mechanisms described above.

Figure 8:
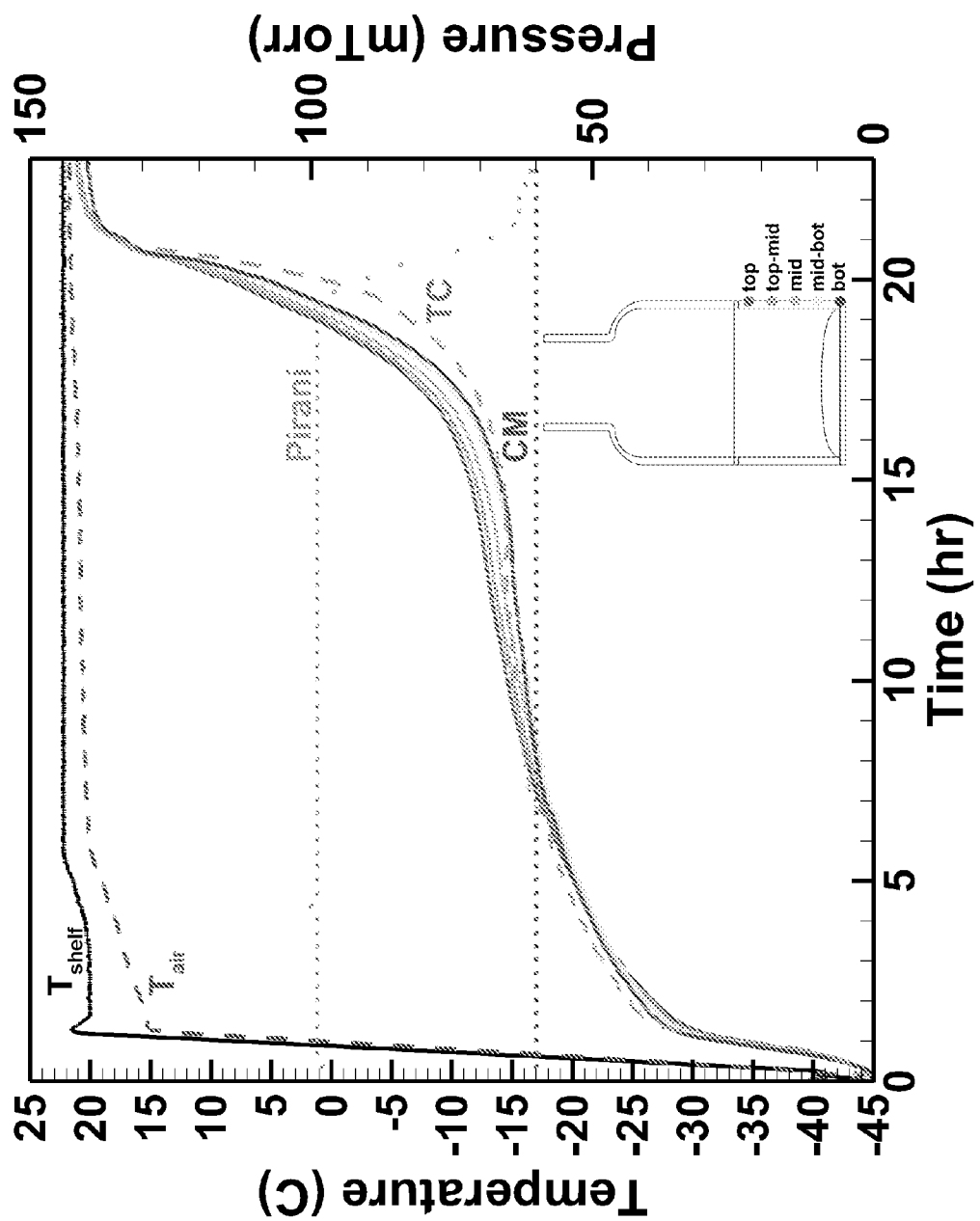
FIG. 8 is a graph of temperature in ° C. vs. time in hours, illustrating the recorded vial #7 (position in the tray shown in FIGS. 5b and 5c) temperature profile during primary drying for a 5% w/v mannitol solution, monitored by two non-invasive multi-points temperature sensing devices and two 36 gauge thermocouple placed in the same vials respectively.

Referring to FIG. 8, a graph of temperature in ° C. vs. time in hours is provided. FIG. 8 illustrates the recorded vial #7 (position in the tray is shown in FIGS. 5b and 5c) temperature profile during primary drying for a 5% w/v mannitol solution, monitored by two non-invasive multi-points temperature sensor and two 36 gauge thermocouple placed in the same vials respectively. Also, process data including shelf temperature, air temperature, Pirani/capacitance manometer pressure measurement were recorded. During this run, the predefined freeze drying recipes (Table 1) are used with shelf temperature set at 20° C. and chamber pressure of 60 mTorr. At the beginning of the primary drying, the shelf temperature rises from 20° C. to 20° C. This causes a sharp increase in vial temperature, as observed in both the virtual thermocouple and conventional thermocouple readings. At the beginning, of primary drying (after 8 hours as shown in FIG. 8), as the product temperature raises, the bottom sensor shows the highest reading and the top sensor shows the lowest. As the primary drying continues and the sublimation front progresses, this trend reverses and the top sensor reading overpasses the top-mid, mid, mid-bot, and bottom sensor ones. As shown in FIG. 8 is clearly captured by multi-points temperature sensor. The endpoint of primary drying can be determined based on the Pirani pressure and capacitance manometer pressure measurements. The primary drying ends as the Pirani reading converges to capacitance manometer measurement. Both thermocouples and multi-Points temperature sensors identified the endpoint of primary drying at identical time marks. All temperature sensing points on the temperature sensing devices showed very good agreement in the temperature readings over time profile with the data obtained from the thermocouples. It is interesting to note that both multi-points temperature sensors indicated an early increase in temperature at the end of primary drying relative to thermocouple data.

The performance of virtual thermocouple was validated using data from the performed freeze-drying experiments as mentioned above. To obtain the product temperature inside the vial, the numerical model was tuned to match the multi-point sensor data during the primary drying stage demonstrated in FIG. 8. As a result, the virtual thermocouple reading should be close to the product temperature measured by thermocouple in the experiment which would mean the good performance of virtual thermocouple. To simplify the tuning process, input parameters were divided into three groups: the first group is the fixed simulation parameters, provided in Table 2. These are parameters that are not subject to change from run to run for the same product (such as glass vial properties, material properties (i.e. dried product properties), and ice/vapor characteristics). The second group are the process simulation parameters, listed in Table 3. These parameters are the real process data including shelf/air temperatures (measured with built-in thermocouples) and chamber pressure (measured with capacitance manometer) which are directly imported into the model. The last group are the tuned process parameters; these are the parameters that vary from vial to vials (i.e. heat transfer coefficients) they are tuned to match the model output with the actual sensor data. The vapor viscosity was calculated according to Alexeenko et al. where the experimentally measured values as well as the data from International Association for the Properties of Water and Steam Formulation for water vapor viscosity in the range of −23° C. to 227° C. The power-law curve fit based on Variable Hard Sphere (VHS) molecular model with an effective diameter of 5.78 Å:

$$\mu = 8.9007 \times 10^{-6} (T/273.15) [Pa \times s]$$

TABLE 2

Fixed Simulation Parameters

| Parameter | Dimension | Value |
|---|---|---|
| Ice Heat Capacity | J/Kg/K | 1967.8 |
| Product Heat Capacity | J/kg/K | 1715 |
| Vapor Heat Capacity | J/kg/K | 1674.7 |
| Latent Heat of Sublimation | J/kg | 2.838× $10^{-6}$ |
| Ice Thermal Conductivity | W/m/K | 2.1 |
| Product Thermal Conductivity | W/m/K | 0.028 |
| Vapor Thermal Conductivity | W/m/K | 0.025 |
| Vapor Molar Mass | g/mol | 18 |
| Vapor Viscosity | Pa × s | Equation 4 |
| Ice density | kg/m$^3$ | 913 |
| Product density | kg/m$^3$ | 75 |
| Silica Glass Heat Capacity | J/kg/K | 830 |
| Silica Glass Density | kg/m$^3$ | 2230 |
| Silica Glass Thermal Conductivity | W/m/K | 1.14 |

TABLE 3

Process Simulation Parameters

| Parameter | Dimension | Value |
|---|---|---|
| Air Temperature | K | Exp. |
| Initial Temperature | K | 228 |
| Shelf Temperature | K | Exp. |
| Chamber Pressure | mTorr | 70 |

Figure 9A:
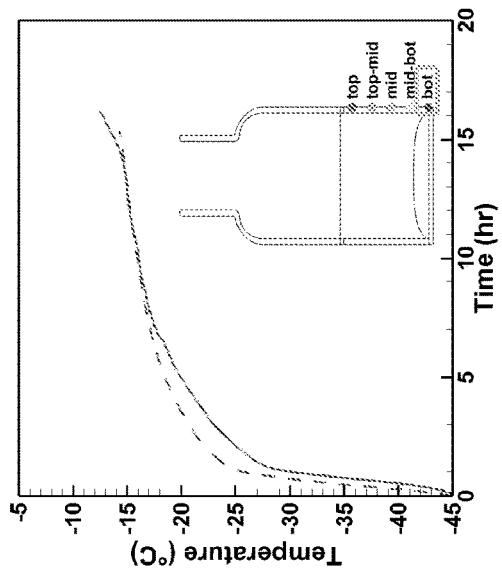
FIGS. 9a, 9b, and 9c provide graphs of temperature in ° C. vs. time in hour for three sensors at the center vial #7 (schematic position of the vial is shown in FIG. 5b) at three positions: top (FIG. 9a); middle (FIG. 9b); and bottom (FIG. 9c).
Figure 9B:
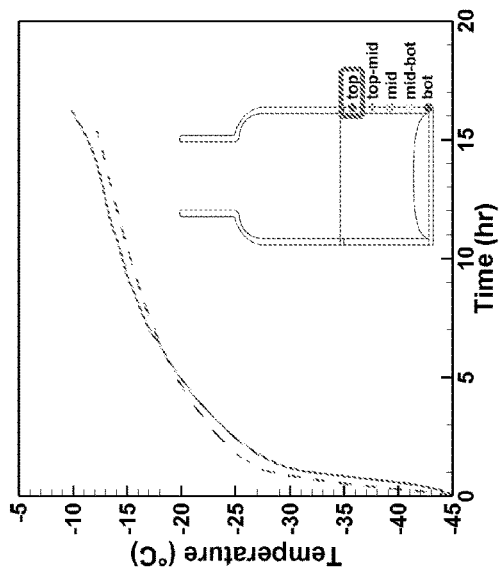
Figure 9C:
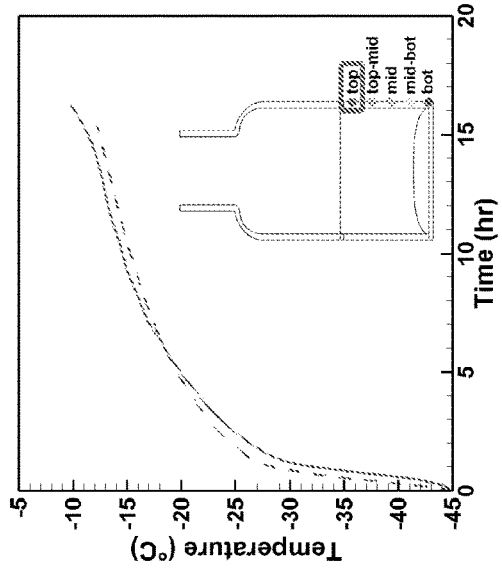

Referring to FIGS. 9a-9c graphs of temperature in ° C. vs. time in hour for three sensors at the center vial #7 (schematic position of the vial is shown in FIG. 5b) at three positions: top (FIG. 9a); middle (FIG. 9b); and bottom (FIG. 9c). The solid curves in FIGS. 9a-9c show the temperature profile measured by the temperature sensing device. The simulation is performed for two vials: vial #6 and vial #7 as indicated in FIG. 5b. Both vials are surrounded by 6 other vials and can be considered as center vials. In both cases, the difference between the simulation and the experimental data simulation is within 1° C. The experimental readings of the air temperature in the vicinity of the vial as well as actual shelf temperature are used in the simulation.

Figure 10B:
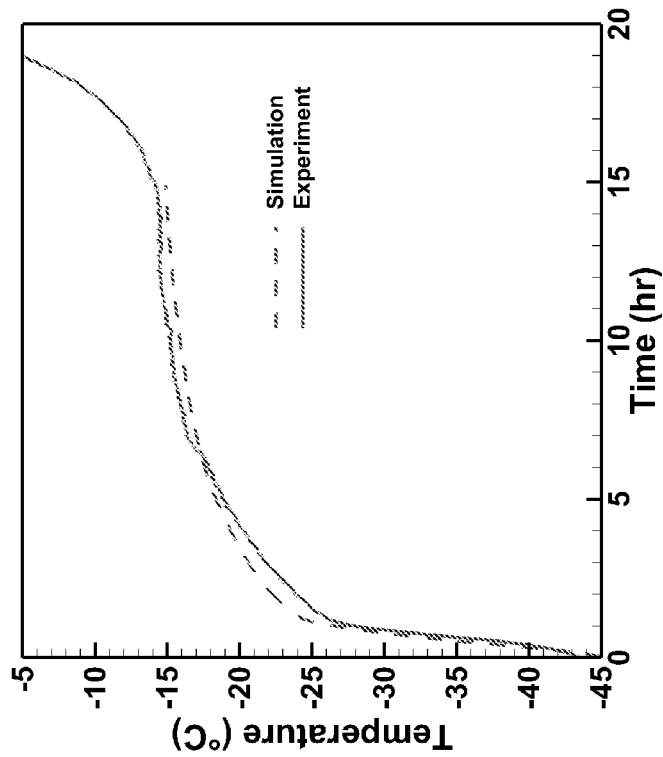
FIGS. 10a and 10b are graphs of temperature in ° C. vs. time in hour depicting the virtual thermocouple performance evaluation for the central vial #6 (schematic position of the vial is shown in FIG. 5b) during primary drying stage providing temperature time history profiles measured by the temperature sensing device (solid) vs. simulated temperature readings (dashed) shown in FIG. 10a, and temperature time history measured by thermocouple in experiment (solid) vs. virtual thermocouple reading (dashed) shown in FIG. 10b.
Figure 10A:
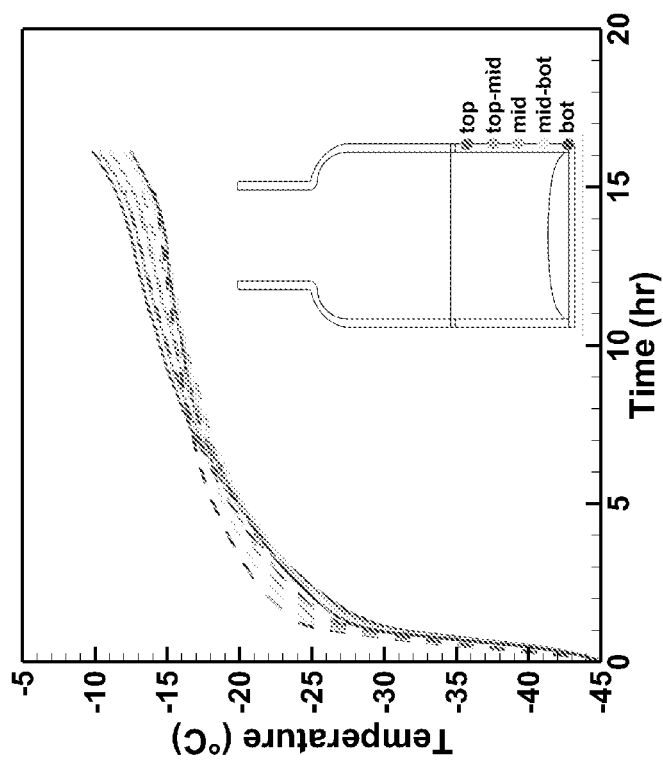
Figure 11B:
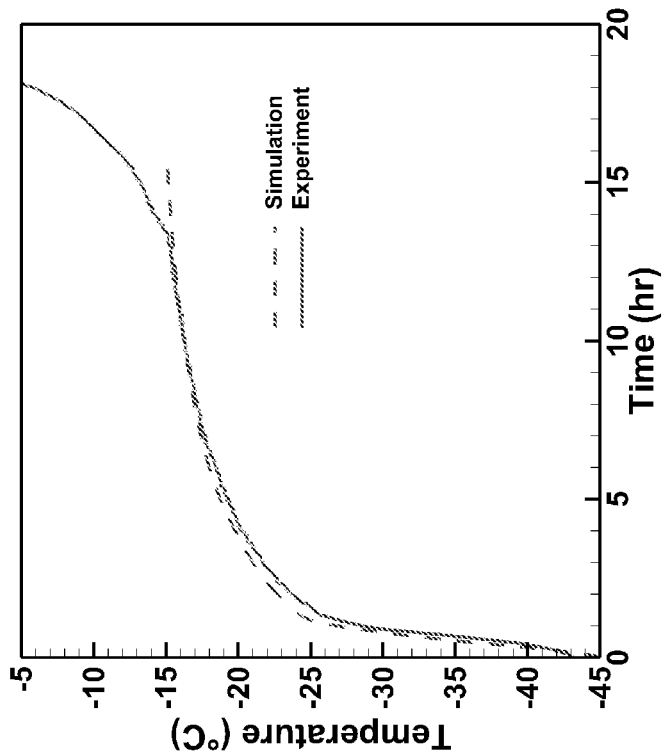
FIGS. 11a and 11b are two more graphs of temperature in ° C. vs. time in hour are presented depicting the virtual thermocouple performance evaluation for the central vial #7 (schematic position of the vial is shown in FIG. 5b) during primary drying stage providing temperature time history profiles measured by the temperature sensing device (solid) vs. simulated temperature readings (dashed) shown in FIG. 11a, and temperature time history measured by thermocouple in experiment (solid) vs. virtual thermocouple reading (dashed) shown in FIG. 11b.
Figure 11A:
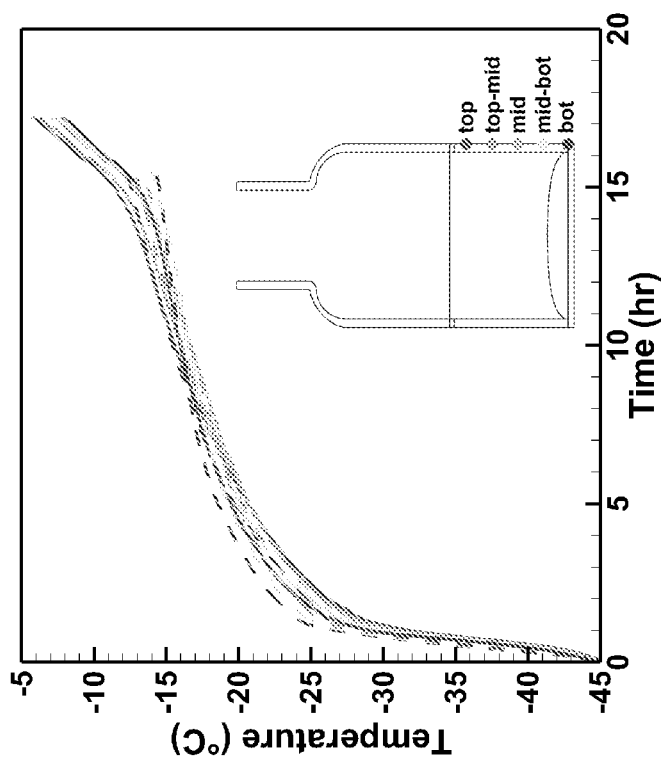

Referring to FIGS. 10a and 10b, graphs of temperature in ° C. vs. time in hour are presented depicting the virtual thermocouple performance evaluation for the central vial #6 (schematic position of the vial is shown in FIG. 5b) during primary drying stage providing temperature time history profiles measured by the temperature sensing device (solid) vs simulated temperature readings (dashed) shown in FIG. 10a, and temperature time history measured by thermocouple in experiment (solid) vs. virtual thermocouple reading (dashed). FIG. 10b demonstrates the temperature profile that the simulation outputs at the position of the thermocouple (in the center of the vial bottom) after the model is tuned to match the non-invasive multi-point sensor data of vial #6. The heat transfer coefficients tuned to 9 and 12 W/m$^2$/K for the center and the edge of the vial bottom correspondingly. Also, 0.2 W/m$^2$/K heat transfer was applied to the top part of the vial above the product during the tuning process. Referring to FIGS. 11*a* and 11*b*, two more graphs of temperature in ° C. vs. time in hour are presented depicting the virtual thermocouple performance evaluation for the central vial #7 (schematic position of the vial is shown in FIG. 5*b*) during primary drying stage temperature time history profiles measured by the temperature sensing device (solid) vs simulated temperature readings (dashed). The sensors' experimental temperature readings and simulations results are shown for both vials in FIGS. 10*a* and 11*a*. The simulation (dashed lines) results for the temperature are within 1-2° C. from the experimental data during the whole period of primary drying. The deviations close to the end of primary drying are due to the artificial criteria of the end of the process in simulation. The process is over when the minimum distance between the freezing front and the vial bottom is close to zero. Thus, when the edge of the front reaches the bottom, the simulation stops. As shown in FIG. 11*b*, the simulation generated product temperature data shows a great agreement with the actual thermocouple placed at the same location inside the same vial. The same tuning process was done to vial #7 as well. FIG. 10*b* shows the simulation generated product temperature with the thermocouple measurement. The heat transfer coefficients equal to 8 and 11 W/m²/K were set for the center and the edge of the vial's #7 bottom. These prove that virtual thermocouple can measure product temperature accurately and non-invasively.

Figure 12:
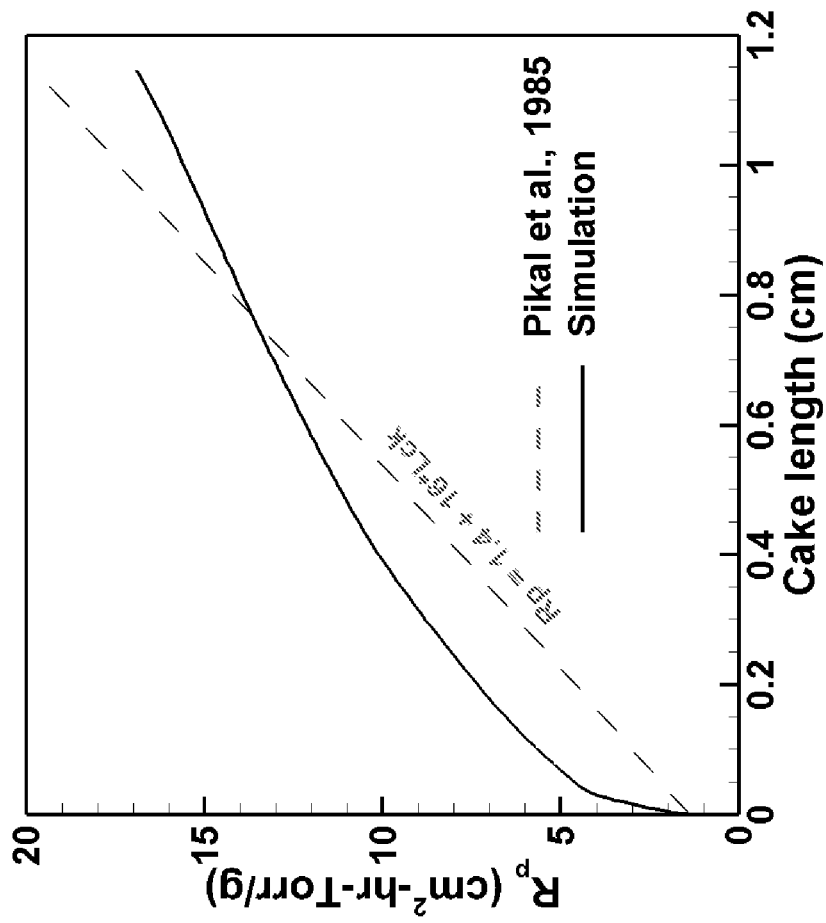
FIG. 12 is a graph of $R_p$ (mass transfer resistance) vs. cake length (cm), which shows the mass transfer resistance calculated from the simulation vs. obtained empirically as a function of the dried thickness or cake thickness.

Referring to FIG. 12, a graph of $R_p$ (mass transfer resistance) vs. cake length (cm), which shows the mass transfer resistance calculated from the current simulation vs. obtained empirically as a function of the dried thickness or cake thickness $L_{ck}$ as $$R_p = A_0 + (A_1 \times L_{ck})/(1 + A_2 \times L_{ck}) \tag{5}$$

where $A_0 = 1.4$,
$A_1 = 16$, and
$A_2 = 0$.

The cake resistance from the current simulation is calculated according to:

$$R_p = A_p \times (P_{sub} - P_{ch})/\dot{m}_{ice} \tag{6}$$

where $A_p$ is a product area in the vials,
$P_{sub}$ and $P_{ch}$ are sublimation front and chamber pressures, and
$\dot{m}_{ice}$ is sublimation rate. R p is a measure of vapor flow impedance resulting from the dried layer structure. During the primary drying process, the dried layer thickness increases thus changing $R_p$. It is worth noting that in the current multiphysics simulation, the product permeability is the only parameter analogous to $R_p$ which does not depend on cake length.

Figure 13:
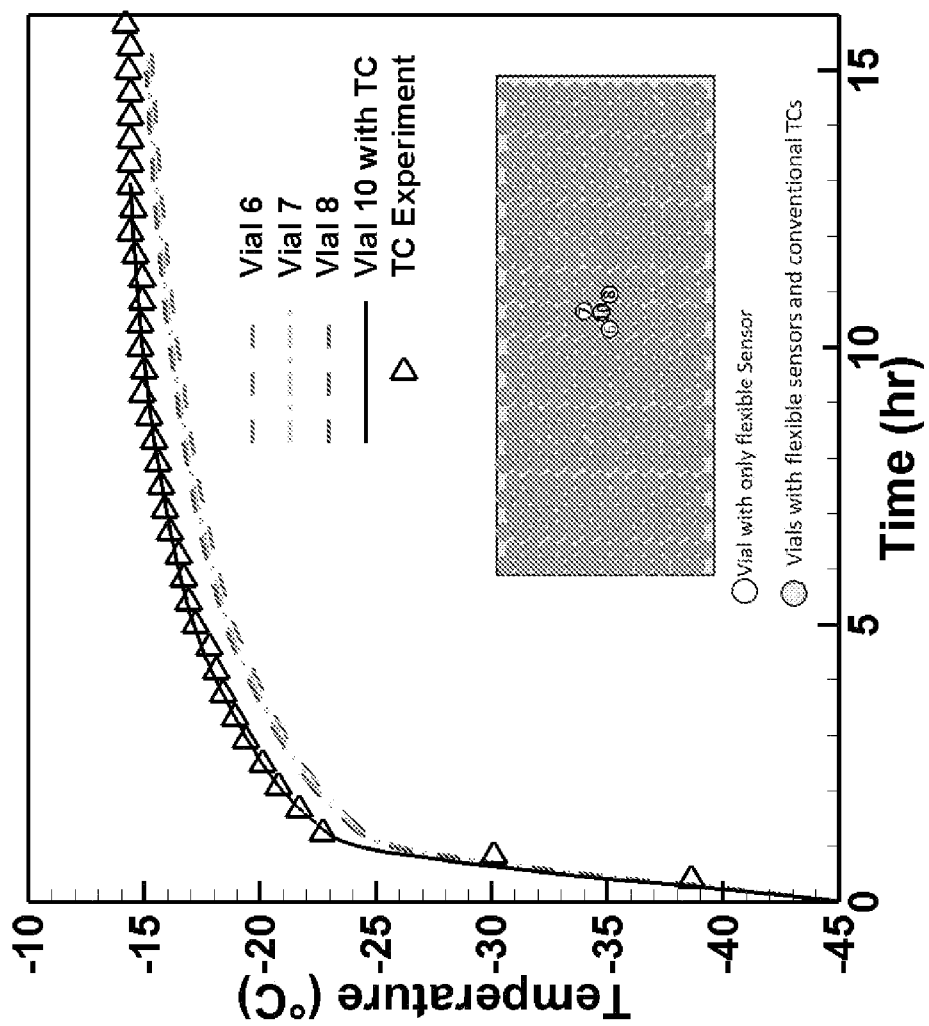
FIG. 13 is a graph of temperature in ° C. vs. time in hours demonstrating the product temperature profiles during primary drying stage, including virtual thermocouple readings for vials without thermocouple (Vial 6,7,8), vial with thermocouple (Vial 10 with TC, shown as a circle with dots) and experimental thermocouple readings (TC Experiment).

With the ability to measure the product temperature close to the center of the vial bottom during primary drying, we utilize the power of virtual thermocouple to investigate the effects of wire thermocouple heating. FIG. 5*c* shows the setup of this experiment, 3 vials equipped with a virtual thermocouple were placed at the center of a full tray (i.e., numbered dots in FIG. 5*c*), surrounding a vial equipped with both virtual temperature as well as wire temperature (placed inside of the vial). This effect is demonstrated in FIG. 13, which is a graph of temperature in ° C. vs. time in hours demonstrating the product temperature profiles during primary drying stage, including virtual thermocouple readings for vials without thermocouple (Vial 6,7,8), vial with thermocouple (Vial 10 with TC, shown as a circle with dots) and experimental thermocouple readings (TC Experiment). The temperature at the walls of four vials in the center of the shelf was measured using the temperature sensing devices. For each of the vials, the simulation was performed and heat transfer coefficients were adjusted so that the best agreement between sensor readings and experimental sensor data is achieved. From FIG. 13, it can be seen that a very good agreement between the vial 10 thermocouple measurement and simulation is obtained. For other vials, the heat transfer coefficient was reduced to get the experiment/simulation agreement. Thus, the plot shows that the difference between the actual product temperature and the one registered by thermocouple can be up to 3° C. and is caused by the presence of the thermocouple in a vial. The use of flexible temperature sensing devices allows performing actual temperature measurements.

The development of optimal lyophilization procedures for different formulations in vials includes a combination of experimental tests and computational approaches for measuring product temperature. Tight temperature control is essential in both the freezing and primary drying step because the structure of the dried product (cake) is determined by the freezing protocol. In particular, it is important to obtain a good uniformity of the properties of the entire batch. Nucleation of ice and the freezing steps must be completed in a small temperature interval. Even more important is the control of the temperature and the drying time during primary drying, when it is necessary to avoid the collapse of the product. Even sometimes freeze-drying is considered a "mild" process, the collapse temperature of some typical pharmaceutical products can be relatively low. Also, as the residual moisture content typically affects it negatively, the product limit temperature may be very low during primary drying because, even after the ice sublimation, significant amounts of bound water can be present in the product. Furthermore, heat is required during the process because the sublimation is endothermic, therefore the shelf temperature has to be optimized to maximize the drying speed and reduce the process duration. Generally speaking, as a manipulated variable, the shelf temperature is selected based on industrial standards. Normally, control systems are used to track the temperature of the heat transfer fluid (for example, silicon oil), passing internally through the shelves, based on the pre-set value. However, the heat transfer control obtained by the control and manipulation of the shelf temperature is quite slow, partly because of the thermal inertia of the system, and shelf heating and cooling may induce a huge lag in the response of the product temperature. Alternatively, the chamber pressure of the dryer can be controlled and manipulated. This is a very responsive way to control the drying process because the heat flux from shelf to product strongly depends on chamber pressure. However, this approach can be quite risky, because the product temperature practically follows the pressure variations, therefore changes of few pascals could easily jeopardize the product quality.

Since the critical part of any lyophilization procedure is the primary drying phase, special attention has to be paid to critical modeling parameters of drying of a porous cake-solid ice system. In present disclosure, a novel approach termed the virtual thermocouple is presented, based on the use of flexible temperature sensing device and advanced multi-physics simulation was proposed and investigated as a means for the monitoring of freezing and drying behavior and product temperature during freeze-drying. The developed virtual thermocouple combining the one-dimensional model with surface sublimation sub-model can be used as a stand-alone, fast and accurate computational tool for the prediction of lyophilization dynamics, but can also be included into a general 3D computational fluid dynamics (CFD) computational framework as a vital part of the final virtual lyophilizer model. The proposed virtual thermocouple was also found to give quantitatively accurate results for drying behavior. In particular, the temperature sensing device can give information about both the temperature profile and the position of the sublimating interface. This information then combined with the advanced multi-physics simulation provides the actual product temperature and shows a great matching with thermocouple measurement. For the first time, the ability to non-invasive monitoring product temperature of individual vials during primary drying was demonstrated. This proves that the proposed virtual thermocouple technology can effectively track the profile of temperature within the volume of the solution of an individual vial during the freeze-drying process.

Referring to FIGS. 14a and 14b, schematics of a method of manufacture of the temperature sensing device shown in FIG. 1, according to one embodiment of the present disclosure is provided. Specifically, FIGS. 14a and 14b show an example fabrication process for creating the flexible temperature sensing device. Sensors are fabricated on copper Kapton laminate Pyralux AP8555R by DUPONT. The substrate thickness can be about 0.127 mm and the copper thickness can be about 0.018 mm. The copper is patterned using a photosensitive lithography microfabrication processes. Specifically, we used negative dry film photoresist TentMaster TM200i by DUPONT hot rolled on the flexible substrate and exposed to 14 mW/cm2 of UV light through a photomask using the MA6 KARL SUSS aligner. We also used the Copper etchant CE-100 by Transene to form the desired copper traces at the end of the manufacturing step shown in FIG. 14b. The sensor assembly can be transferred on the outside or inside of the vial depending on the application as shown in FIG. 14c, which is a plan view of a vial with the temperature sensing device coupled thereto.

Those having ordinary skill in the art will recognize that numerous modifications can be made to the specific implementations described above. The implementations should not be limited to the particular limitations described. Other implementations may be possible.

The invention claimed is:

1. A virtual thermocouple system for non-invasively predicting product characteristics in a lyophilization process, comprising:
   one or more temperature sensing systems each configured to be placed on an associated vial within a lyophilization chamber, the temperature sensing system, comprising:
      a resistive network, comprising:
         a temperature sensing device comprising a plurality of negative temperature coefficient (NTC) thermistors, and
         a load resistor coupled to a corresponding NTC thermistor thus generating a corresponding voltage divider circuit;
      a corresponding system-on-chip coupled to a corresponding resistive network and configured to i) power the corresponding resistive network, ii) receive corresponding signals from each NTC thermistor of the corresponding temperature sensing device, iii) process the signal associated with each NTC thermistor of the corresponding temperature sensing device and thus generate data associated with each NTC thermistor, and iv) transmitting the processed data; and
   a power generating device configured to provide power to the corresponding system-on-chip; and
   a base stations adapted to i) receive the processed data from a corresponding system-on-chip, and ii) using a predefined model, non-invasively translate the processed data to thermal characteristics of a corresponding product within the corresponding vial.

2. The virtual thermocouple system of claim 1, wherein each NTC thermistor having a first terminal and a second terminal.

3. The virtual thermocouple system of claim 2, wherein each of the first terminals of the plurality of the NTC thermistors configured to be placed at a corresponding height on a corresponding vial.

4. The virtual thermocouple system of claim 3, wherein each of the second terminals of the plurality of the NTC thermistors configured to terminate at a uniform plane.

5. The virtual thermocouple system of claim 1, each of the one or more temperature sensing devices includes between 2 and 20 NTC thermistors.

6. The virtual thermocouple system of claim 5, the NTC thermistor with the lowest disposed first terminal is configured to be placed on the vial so that the associated first terminal is aligned with a bottom portion of the vial.

7. The virtual thermocouple system of claim 5, wherein distance between two adjacent NTC thermistors is between about 1 mm and about 10 cm.

8. The virtual thermocouple system of claim 7, wherein nonlinear characteristic of each NTC thermistor is defined based on:

$$1/T = A + B\ln(R) + C(\ln(R))3$$

where T is temperature in degrees Kelvin,
Ln(R) is a natural logarithm of measured resistance of the associated NTC thermistor, and
A, B, and C are constants.

9. The virtual thermocouple system of claim 1, wherein the one or more system-on-chips transmit the processed data each via a wireless link.

10. The virtual thermocouple system of claim 1, wherein the power generating device is an RF energy harvester.

11. The virtual thermocouple system of claim 1, wherein the power generating device is a battery.

12. The virtual thermocouple system of claim 1, wherein each of the temperature sensing systems is packaged as a single package.

13. The virtual thermocouple system of claim 1, wherein each of the temperature sensing systems is packaged as two or more packages.

14. The virtual thermocouple system of claim 1, wherein the predefined model is defined based on heat mass transfer characteristics of a vial, a product within the vial, and ambient conditions of the vial.

15. The virtual thermocouple system of claim 14, wherein the heat mass transfer characteristics of the model includes:
i) fixed simulation parameters; ii) process simulation parameters; and iii) tuned process parameters.

16. The virtual thermocouple system of claim 15, wherein the fixed simulation parameters are not subject to change from run to run for the same product and include: i) ice heat capacity, ii) product heat capacity, iii) vapor heat capacity, iv) latent heat of sublimation ice thermal conductivity, v) product thermal conductivity, vi) vapor thermal conductivity, vii) vapor molar mass, viii) vapor viscosity ice density, ix) product density, x) silica glass heat capacity, xi) silica glass density, and xii) silica glass thermal conductivity.

17. The virtual thermocouple system of claim 16, wherein the process simulation parameters are parameters which include: i) air temperature, ii) initial product temperature, iii) shelf temperature, and iv) chamber pressure.

18. The virtual thermocouple system of claim 17, wherein the tuned process parameters that vary from vial to vial and include heat transfer coefficients as well as product characteristics including permeability and porosity.

19. The virtual thermocouple system of claim 18, wherein the predefined model predicts spatial and temporal thermal characteristics of the product inside the vial as well spatial and temporal characteristics of the vial surface.

20. The virtual thermocouple system of claim 19, wherein the spatial and temporal characteristics of the vial surface predicted by the predefined model are compared to temporal and spatial thermal characteristics measured by a corresponding one or more temperature sensing systems and differences therebetween generate an error value used as an error correction measure.

21. The virtual thermocouple system of claim 20, wherein the tuned process parameters are iteratively varied based on the error coaction measure, until the error value is below a predetermined number, thereby generating a finalized predefined model.

22. The virtual thermocouple system of claim 21, wherein the finalized predefined model is applied to spatial and temporal measurement of the one or more temperature sensing systems in order to predict thermal characteristics of an associated product within an associated vial.

* * * * *